US 9,257,129 B2

(12) United States Patent
Kamano et al.

(10) Patent No.: US 9,257,129 B2
(45) Date of Patent: Feb. 9, 2016

(54) ORTHOGONAL TRANSFORM APPARATUS, ORTHOGONAL TRANSFORM METHOD, ORTHOGONAL TRANSFORM COMPUTER PROGRAM, AND AUDIO DECODING APPARATUS

(71) Applicant: FUJITSU LIMITED, Kawasaki-shi, Kanagawa (JP)

(72) Inventors: Akira Kamano, Kawasaki (JP); Yohei Kishi, Kawasaki (JP); Shunsuke Takeuchi, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 14/189,148

(22) Filed: Feb. 25, 2014

(65) Prior Publication Data
US 2014/0294181 A1 Oct. 2, 2014

(30) Foreign Application Priority Data

Mar. 28, 2013 (JP) .................................. 2013-070436

(51) Int. Cl.
G10L 19/02 (2013.01)
G06F 17/14 (2006.01)
G10L 19/008 (2013.01)

(52) U.S. Cl.
CPC .......... *G10L 19/0212* (2013.01); *G06F 17/147* (2013.01); *G10L 19/008* (2013.01)

(58) Field of Classification Search
None
See application file for complete search history.

(56) References Cited

U.S. PATENT DOCUMENTS 7,649,939 B2 * 1/2010 LaRocca ................ H04N 19/44
375/240.02
8,660,380 B2 * 2/2014 Bulusu .................. G06F 17/145
382/245

(Continued)

FOREIGN PATENT DOCUMENTS

JP 11-327599 11/1999
JP 2005-128401 5/2005

(Continued)

OTHER PUBLICATIONS

International Standard ISO/IEC 23003-1, Information technology—MPEG audio technologies—Part 1 MPEG Surround, First edition Feb. 15, 2007.
Gluth, R Ed., Institute of Electrical and Electronics Engineers: "Regular FFT-related transform kernels for DCT/DST-based polyphase filter banks", Speech Proceeding 1., Toronto, May 14-17, 1991; [International Conference on Acoustics, Speech & Signal processing. ICASSP], New York, IEEE, US, vol. Conf. 16, Apr. 14, 1991, pp. 2205-2208, XP010043471.
EESR—Extended European Search Report for European Patent Application No. 14156122.5 dated Nov. 24, 2015.

*Primary Examiner* — Paul Huber
(74) *Attorney, Agent, or Firm* — Fujitsu Patent Center

(57) ABSTRACT

An orthogonal transform apparatus computes either one of the real and imaginary components of the quadrature mirror filter coefficient contained in a first subinterval of a plurality of subintervals among which a coefficient sequence containing a plurality of quadrature mirror filter coefficients is divided so that the values of basis functions are symmetrically placed, by computing a sum of products of the plurality of modified discrete cosine transform coefficients and the basis functions corresponding to the subinterval, computes the other one of the real and imaginary components of the quadrature mirror filter coefficient contained in the first subinterval and the real and imaginary components of the quadrature mirror filter coefficient contained in another subintervals by performing a butterfly operation using a computed value produced as a result of the sum of products and computes each quadrature mirror filter coefficient by combining the real component and imaginary component thereof.

17 Claims, 18 Drawing Sheets

(56) References Cited

U.S. PATENT DOCUMENTS

2008/0008248 A1 1/2008 Takakura et al.
2010/0286990 A1 11/2010 Biswas et al.
2011/0185001 A1 7/2011 Zhang et al.

FOREIGN PATENT DOCUMENTS

| JP | 2008-017405 | 1/2008 |
| JP | 2011-510335 | 3/2011 |

* cited by examiner

FIG. 4

| Idx | -15 | -14 | -13 | -12 | -11 | -10 | -9 | -8 | -7 | -6 | -5 |
|---|---|---|---|---|---|---|---|---|---|---|---|
| CLD[idx] | -150 | -45 | -40 | -35 | -30 | -25 | -22 | -19 | -16 | -13 | -10 |
| Idx | -4 | -3 | -2 | -1 | 0 | 1 | 2 | 3 | 4 | 5 | 6 |
| CLD[idx] | -8 | -6 | -4 | -2 | 0 | 2 | 4 | 6 | 8 | 10 | 13 |
| Idx | 7 | 8 | 9 | 10 | 11 | 12 | 13 | 14 | 15 | | |
| CLD[idx] | 16 | 19 | 22 | 25 | 30 | 35 | 40 | 45 | 150 | | |

FIG. 5

| idx | −20 | −19 | −18 | −17 | −16 | −15 | −14 | −13 | −12 | −11 | −10 | | 510 |
| --- | --- | --- | --- | --- | --- | --- | --- | --- | --- | --- | --- | --- | --- |
| CPC[idx] | −2.0 | −1.9 | −1.8 | −1.7 | −1.6 | −1.5 | −1.4 | −1.3 | −1.2 | −1.1 | −1.0 | | 515 |
| idx | −9 | −8 | −7 | −6 | −5 | −4 | −3 | −2 | −1 | 0 | 1 | | 520 |
| CPC[idx] | −0.9 | −0.8 | −0.7 | −0.6 | −0.5 | −0.4 | −0.3 | −0.2 | −0.1 | 0.0 | 1.0 | | 525 |
| idx | 2 | 3 | 4 | 5 | 6 | 7 | 8 | 9 | 10 | 11 | 12 | | 530 |
| CPC[idx] | 0.2 | 0.3 | 0.4 | 0.5 | 0.6 | 0.7 | 0.8 | 0.9 | 1.0 | 1.1 | 1.2 | | 535 |
| idx | 13 | 14 | 15 | 16 | 17 | 18 | 19 | 20 | 21 | 22 | 23 | | 540 |
| CPC[idx] | 1.3 | 1.4 | 1.5 | 1.6 | 1.7 | 1.8 | 1.9 | 2.0 | 2.1 | 2.2 | 2.3 | | 545 |
| idx | 24 | 25 | 26 | 27 | 28 | 29 | 30 | | | | | 550 | |
| CPC[idx] | 2.4 | 2.5 | 2.6 | 2.7 | 2.8 | 2.9 | 3.0 | | | | | 555 | |

500

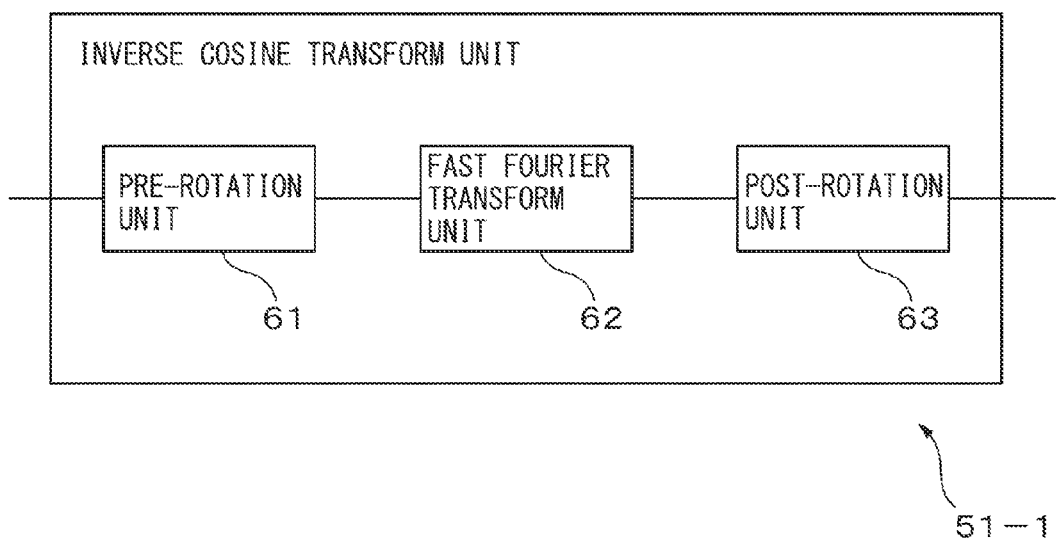
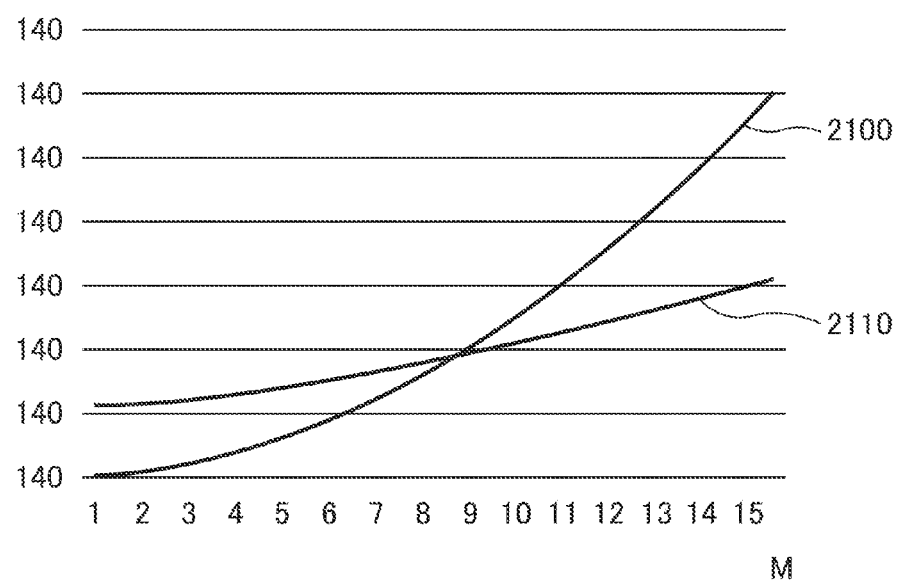

ORTHOGONAL TRANSFORM APPARATUS, ORTHOGONAL TRANSFORM METHOD, ORTHOGONAL TRANSFORM COMPUTER PROGRAM, AND AUDIO DECODING APPARATUS

CROSS-REFERENCE TO RELATED APPLICATION

This application is based upon and claims the benefit of priority of the prior Japanese Patent Application No. 2013-070436, filed on Mar. 28, 2013, the entire contents of which are incorporated herein by reference.

FIELD

The embodiments discussed herein are related to an orthogonal transform apparatus, an orthogonal transform method, an orthogonal transform computer program, and an audio decoding apparatus using the same.

BACKGROUND

Various audio coding systems have been developed in the prior art for compressing the amount of data needed to represent a multichannel audio signal carrying three or more channels. One such known coding system is the MPEG Surround System standardized by the Moving Picture Experts Group (MPEG) (for example, refer to ISO/IEC 23003-1). In the MPEG Surround System, a plurality of channel signals are downmixed to generate spatial information and a main signal representing the main component of each original channel signal, and this main signal and the spatial information are encoded. Further, in this coding system, a residual signal representing a component orthogonal to the main signal is also computed, and this residual signal may also be encoded.

The main signal and the residual signal are each obtained by first transforming the downmix signal into a time domain signal and then transforming it into a frequency domain signal by a modified discrete cosine transform (MDCT). Of these two signals, the main signal once transformed into the time domain signal is further transformed into QMF coefficients representing a time-frequency domain signal by using a quadrature mirror filter (QMF), because upmixing is performed using the spatial information when decoding. Therefore, the residual signal in the frequency domain is also transformed into QMF coefficients in the time-frequency domain so that the residual signal can be used when upmixing.

SUMMARY

Since the orthogonal transforms such as MDCT and QMF are performed over and over again as described above to decode the audio signal encoded by the MPEG Surround System, the amount of computation becomes very large. The larger the amount of computation, the higher is the computational capability demanded of audio decoding apparatus, and the power consumption of the audio decoding apparatus correspondingly increases. There is thus a need to reduce the amount of computation needed to decode the audio signal encoded by the MPEG Surround System.

According to one embodiment, an orthogonal transform apparatus for transforming a plurality of modified discrete cosine transform coefficients contained in a prescribed interval into a coefficient sequence containing a plurality of quadrature mirror filter coefficients is provided. The orthogonal transform apparatus includes: an inverse exponential transform unit which computes either one of the real and imaginary components of the quadrature mirror filter coefficient contained in a first subinterval of a plurality subintervals among which the coefficient sequence is divided so that the values of basis functions used to compute the coefficient sequence are symmetrically placed, by computing a sum of products of the plurality of modified discrete cosine transform coefficients and the basis functions corresponding to the first subinterval, and computes the other one of the real and imaginary components of the quadrature mirror filter coefficient contained in the first subinterval and the real and imaginary components of the quadrature mirror filter coefficient contained in another subintervals of the plurality of subintervals by performing a butterfly operation using a computed value produced as a result of the sum of products; and a coefficient adjusting unit which computes the quadrature mirror filter coefficients by combining the real component and the imaginary component for each of the plurality of quadrature mirror filter coefficients.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating one example of a quantization table that provides a mapping of intensity differences.

FIG. 5 is a diagram illustrating one example of a quantization table that provides a mapping of prediction coefficients.

FIG. 20 is a block diagram of an inverse cosine transform unit.

FIG. 21 is a diagram of graphs illustrating the relationship between the number, M, of MDCT coefficients contained in a computation interval and the amount of computation for IMDET that utilizes the symmetry of basis functions in comparison with that for IMDET that uses FFT.

DESCRIPTION OF EMBODIMENTS

An orthogonal transform apparatus according to one embodiment will be described below with reference to the drawings. In the process for decoding the audio signal encoded by the MPEG Surround System, the process of transforming the frequency domain residual signal (MDCT coefficients) into the time-frequency domain signal (QMF coefficients) requires the largest amount of computation. For example, in the ISO reference decoder, the amount of computation involved in this transforming process accounts for about 70% of the total amount of computation of the decoding process. Accordingly, if the amount of computation needed to transform the MDCT coefficients into the QMF coefficients can be reduced, it becomes possible to reduce the amount of computation needed to decode the audio signal encoded by the MPEG Surround System.

In view of the above, the orthogonal transform apparatus of the embodiment aims to reduce the amount of computation needed to transform the MDCT coefficients into the QMF coefficients. For this purpose, the orthogonal transform apparatus exploits the symmetry of basis functions in a butterfly inverse modified discrete cosine transform (IMDCT) and a butterfly inverse modified discrete sine transform (IMDST) that are used when transforming the MDCT coefficients into the QMF coefficients. In this patent specification, IMDCT and IMDST are collectively referred to as the inverse modified discrete exponential transform (IMDET).

In the present embodiment, the multichannel audio signal to be decoded is a 5.1-channel audio signal. However, the multichannel audio signal to be decoded is not limited to a 5.1-channel audio signal, but may be, for example, a 7.1-channel audio signal.

Figure 1:
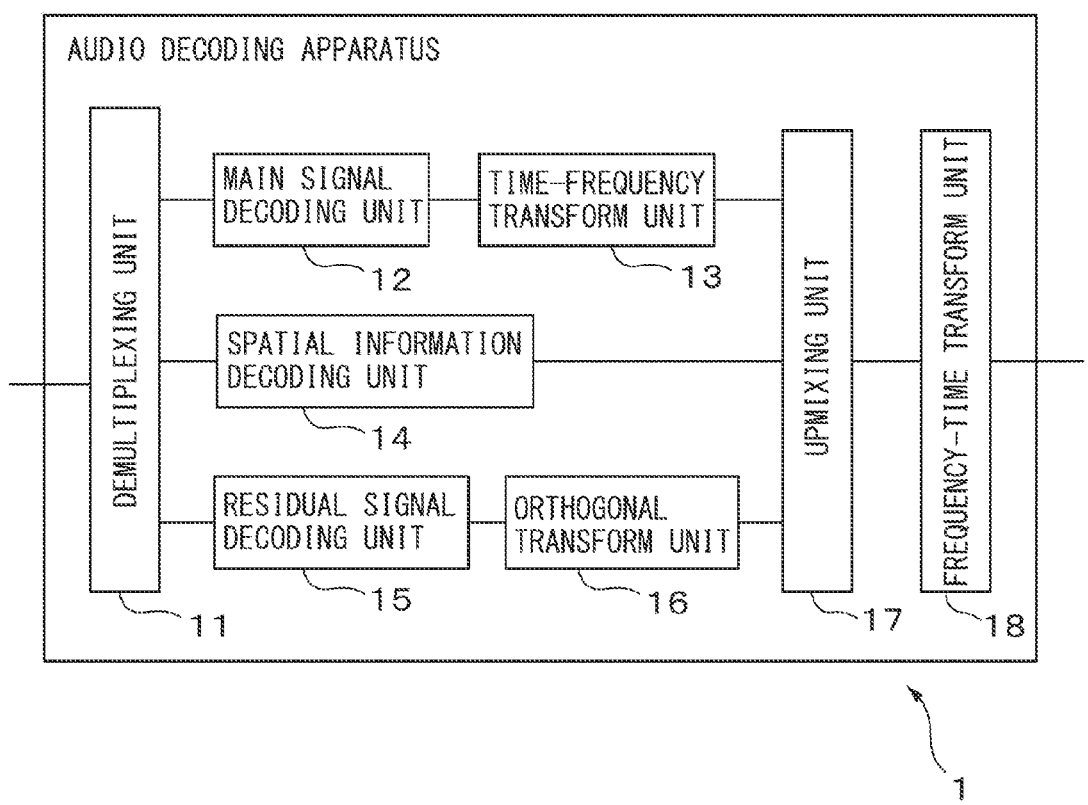
FIG. 1 is a diagram schematically illustrating the configuration of an audio decoding apparatus incorporating an orthogonal transform apparatus according to one embodiment.

FIG. 1 is a diagram schematically illustrating the configuration of an audio decoding apparatus 1 according to one embodiment. The audio decoding apparatus 1 includes a demultiplexing unit 11, a main signal decoding unit 12, a time-frequency transform unit 13, a spatial information decoding unit 14, a residual signal decoding unit 15, an orthogonal transform unit 16, an upmixing unit 17, and a frequency-time transform unit 18.

These units constituting the audio decoding apparatus 1 are each implemented as a separate circuit. Alternatively, these units constituting the audio decoding apparatus 1 may be implemented on the audio decoding apparatus 1 in the form of a single integrated circuit on which the circuits corresponding to the respective units are integrated. Further alternatively, these units constituting the audio decoding apparatus 1 may be implemented as functional modules by executing a computer program on a processor contained in the audio decoding apparatus 1.

The demultiplexing unit 11 demultiplexes a main signal code, a spatial information code, and an encoded residual signal from a data stream containing the encoded audio signal in accordance with a data format carrying the encoded audio signal. The main signal code includes an Advanced Audio Coding (AAC) code and a Spectral Band Replication (SBR) code.

Figure 2:
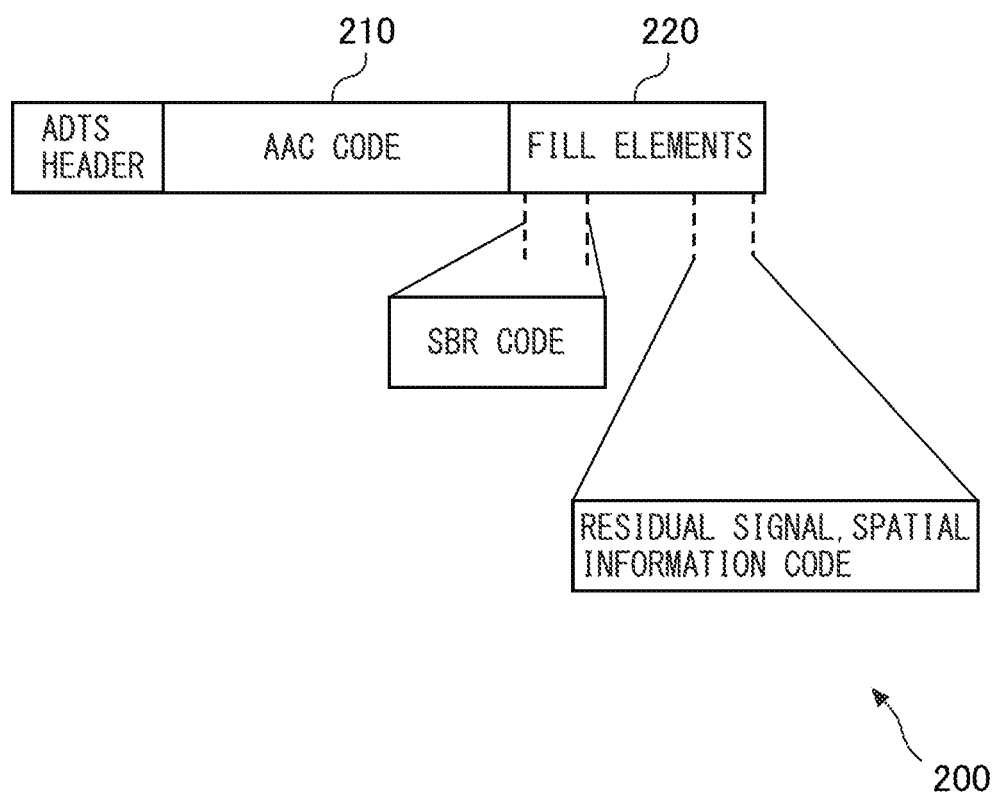
FIG. 2 is a diagram illustrating one example of a data format carrying an encoded audio signal.

FIG. 2 is a diagram illustrating one example of the data format carrying the encoded audio signal. In the illustrated example, the encoded audio signal is created in accordance with the MPEG-4 ADTS (Audio Data Transport Stream) format. In the encoded data sequence 200 depicted in FIG. 2, the AAC code is stored in a data block 210. The SBR code, the spatial information code, and the encoded residual signal are stored in designated areas within a data block 220 that stores FILL elements of the ADTS format.

The demultiplexing unit 11 passes the main signal code to the main signal decoding unit 12. Further, the demultiplexing unit 11 passes the spatial information code to the spatial information decoding unit 14 and the encoded residual signal to the residual signal decoding unit 15.

The main signal decoding unit 12 decodes the main signal code which is an encoded version of the main signal representing the main component of a stereo signal generated by downmixing the original multichannel audio signal. The main signal decoding unit 12 reconstructs low-frequency components for the left and right channels by decoding the AAC code in accordance with, for example, the AAC code decoding process described in the ISO/IEC 14496-3 specification. More specifically, the main signal decoding unit 12 reconstructs a quantized signal by entropy decoding the AAC code, and reconstructs the MDCT coefficients by inverse-quantizing the quantized signal. Then, the main signal decoding unit 12 reconstructs the low-frequency components for the left and right channels on a frame-by-frame basis by applying the IMDCT to the reconstructed MDCT coefficients.

Further, the main signal decoding unit 12 reconstructs high-frequency components for the left and right channels on a frame-by-frame basis by decoding the SBR code in accordance with, for example, the SBR code decoding process described in the ISO/IEC 14496-3 specification. Then, the main signal decoding unit 12 reconstructs the left and right channel signals of the stereo signal by combining the low-frequency components and high-frequency components on a channel-by-channel basis. The main signal decoding unit 12 passes the reconstructed stereo signal to the time-frequency transform unit 13.

The time-frequency transform unit 13 is one example of a quadrature mirror filtering unit, and transforms each of the time-domain channel signals of the reconstructed stereo signal into the QMF coefficients in the time-frequency domain on a frame-by-frame basis by using a QMF filter bank.

The QMF filter bank is expressed by the following equation.

$$QMF(k, n) = \exp\left[j\frac{\pi}{128}(k + 0.5)(2n + 1)\right], 0 \le k < 64, 0 \le n < 128 \quad (1)$$

where n is a variable representing the time, and represents the nth time when the stereo signal of one frame is divided into 128 equal parts along its time direction. The frame length can be set to any value that falls within the range of 10 to 80 msec. On the other hand, k is a variable representing the frequency band, and represents the kth frequency band when the frequency band of the frequency signal is divided into 64 equal parts.

The time-frequency transform unit 13 passes the computed QMF coefficients to the upmixing unit 17.

The spatial information decoding unit 14 decodes the spatial information code received from the demultiplexing unit 11. The spatial information includes, for example, the degree of similarity ICC between two channels that represents the degree of sound spreading, and the intensity difference CLD between two channels that represents the degree of sound localization. The spatial information further includes a prediction coefficient CPC for predicting the center channel signal from the right and left channel signals. The degree of similarity ICC, the intensity difference CLD, and the prediction coefficient CPC are obtained on a frequency-by-frequency basis when downmixing the audio signal. The spatial information code includes a Huffman code for each of the degree of similarity ICC, the intensity difference CLD, and the prediction coefficient CPC.

The spatial information decoding unit 14 reconstructs an index difference value by referring to a table that provides a mapping between the index difference value, such as the degree of similarity ICC between adjacent frequencies, and the Huffman code. The spatial information decoding unit 14 reconstructs the index value for each frequency band by sequentially adding up the index differences on a frequency-band by frequency-band basis. Then, the spatial information decoding unit 14 determines the quantized value representing the degree of similarity ICC, the intensity difference CLD, or the prediction coefficient CPC corresponding to that index value, by referring to a table that provides a mapping between the index value and the quantized value representing the degree of similarity ICC, the intensity difference CLD, or the prediction coefficient CPC, respectively.

Figure 3:
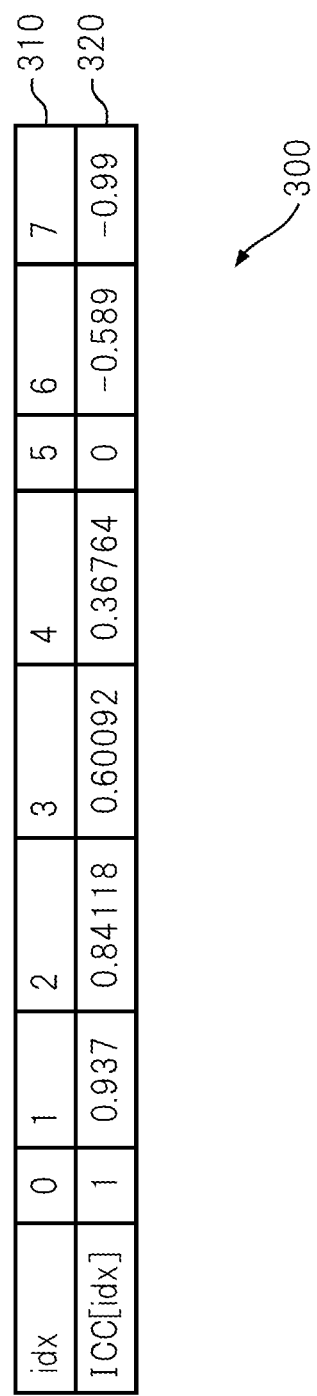
FIG. 3 is a diagram illustrating one example of a quantization table that provides a mapping of degrees of similarity.

FIG. 3 is a diagram illustrating one example of a quantization table for the degree of similarity. In the quantization table 300 illustrated in FIG. 3, each entry in the upper row 310 carries the index value, and each entry in the lower row 320 carries the quantized value for the degree of similarity corresponding to the index value in the same column. The range of values that the degree of similarity can take is from −0.99 to +1. For example, when the index value of the frequency band k is 3, the spatial information decoding unit 14 refers to the quantization table 300 and determines that 0.60092 corresponding to the index value 3 is the quantized value of the degree of similarity.

FIG. 4 is a diagram illustrating one example of a quantization table for the intensity difference. In the quantization table 400 illustrated in FIG. 4, each entry in rows 410, 430, and 450 carries the index value, and each entry in rows 420, 440, and 460 carries the quantized value for the intensity difference corresponding to the index value in the same column in the corresponding one of the rows 410, 430, and 450. For example, when the index value of the frequency band k is 5, the spatial information decoding unit 14 refers to the quantization table 400 and determines that 10 corresponding to the index value 5 is the quantized value of the density difference.

FIG. 5 is a diagram illustrating one example of a quantization table for the prediction coefficient. In the quantization table 500 illustrated in FIG. 5, each entry in rows 510, 520, 530, 540, and 550 carries the index value, and each entry in rows 515, 525, 535, 545, and 555 carries the quantized value for the prediction coefficient corresponding to the index value in the same column in the corresponding one of the rows 510, 520, 530, 540, and 550. For example, when the index value of the frequency band k is 3, the spatial information decoding unit 14 refers to the quantization table 500 and determines that 0.3 corresponding to the index value 3 is the quantized value of the prediction coefficient. The spatial information decoding unit 14 passes the quantized values of the spatial information for each frequency band to the upmixing unit 17.

The residual signal decoding unit 15 decodes the encoded residual signal which is a component orthogonal to the main signal. In the MPEG Surround System, since the residual signal is also AAC encoded, MDCT is applied to the residual signal when encoding it. Accordingly, the residual signal decoding unit 15 reconstructs the residual signal represented by the MDCT coefficients, by decoding the residual signal in accordance with, for example, the AAC code decoding method described in the ISO/IEC 13818-7 specification. The MDCT coefficients are supplied to the orthogonal transform unit 16.

The orthogonal transform unit 16 is one example of the orthogonal transform apparatus, and transforms the residual signal represented by the MDCT coefficients as frequency domain signals into the QMF coefficients as time-frequency domain signals. The details of the orthogonal transform unit 16 will be described later.

The upmixing unit 17 reconstructs the QMF coefficients for each channel of the 5.1-channel audio signal by upmixing, based on the spatial information, the QMF coefficients of the left and right channels of the stereo signal and the QMF coefficients of the residual signal for each frequency band. For this purpose, the upmixing unit 17 may use the upmix technique specified, for example, in the ISO/IEC 23003-1 specification. For example, by upmixing the QMF coefficients of the left and right channels of the stereo signal and the QMF coefficients of the residual signal by using the spatial information, the upmixing unit 17 reconstructs the QMF coefficients for three channels, i.e., the left, right, and center channels. Further, by upmixing the reconstructed left channel QMF coefficients by using the spatial information computed when downmixing the front-left channel and the rear-left channel, the upmixing unit 17 reconstructs the QMF coefficients for the front-left channel and the rear-left channel. Similarly, by upmixing the reconstructed right channel QMF coefficients by using the spatial information computed when downmixing the front-right channel and the rear-right channel, the upmixing unit 17 reconstructs the QMF coefficients for the front-right channel and the rear-right channel. Further, by upmixing the reconstructed center channel QMF coefficients by using the spatial information computed when downmixing the center channel and the bass channel, the upmixing unit 17 reconstructs the QMF coefficients for the center channel and the bass channel.

The upmixing unit 17 passes the QMF coefficients reconstructed for each channel to the frequency-time transform unit 18.

The frequency-time transform unit 18 is one example of an inverse quadrature mirror filtering unit, and reconstructs the 5.1-channel audio signal by processing the QMF coefficients of each channel by reversing the QMF filter bank process performed by the time-frequency transform unit 13. The frequency-time transform unit 18 outputs the reconstructed audio signal, for example, to a speaker.

Figure 6:
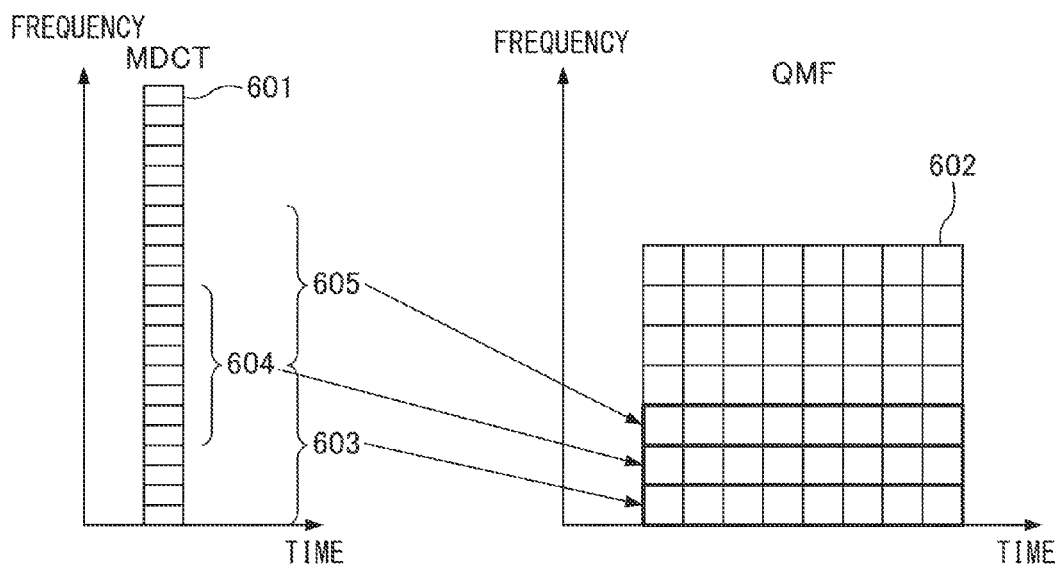
FIG. 6 is a conceptual diagram for explaining how MDCT coefficients are transformed into QMF coefficients.

The orthogonal transform unit 16 will be described in detail below. FIG. 6 is a conceptual diagram for explaining how the MDCT coefficients are transformed into the QMF coefficients. The array of MDCT coefficients is constructed from a plurality of coefficients arrayed only in the direction of the frequency axis. On the other hand, the array of QMF coefficients is constructed from a plurality of coefficients arrayed in the direction of the time axis as well as in the direction of the frequency axis.

In view of the above, when transforming the MDCT coefficients into the QMF coefficients, the orthogonal transform unit 16 divides the whole array of the MDCT coefficients into a plurality of frequency bands, each overlapping with an adjacent frequency band by one half of the frequency band, such as the frequency bands 603 to 605, in accordance with the ISO/IEC 23003-1 specification. In this case, each frequency band has a length twice that of the frequency band to which the conventional IMDCT is applied, and contains, for example, a number, 2N, of successive MDCT coefficients. Then, by applying the butterfly IMDET to each such frequency band, and thus canceling out aliasing distortions occurring between the frequency bands, the orthogonal transform unit 16 obtains a number, 2N, of QMF coefficients arranged along the direction of the time axis for each frequency band. However, the amount of computation involved in the butterfly IMDET is very large. In view of this, the orthogonal transform unit 16 according to the present embodiment exploits the symmetry of the basis functions of the IMDET in order to reduce the amount of computation involved in the butterfly IMDET.

Figure 7:
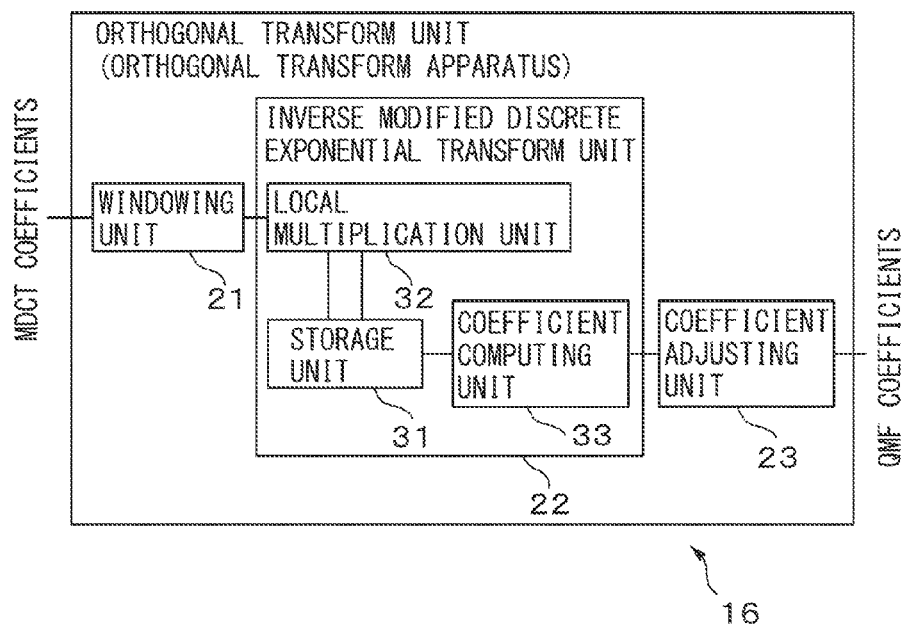
FIG. 7 is a block diagram of an orthogonal transform unit.

FIG. 7 is a block diagram of the orthogonal transform unit 16. The orthogonal transform unit 16 includes a windowing unit 21, an inverse modified discrete exponential transform unit 22, and a coefficient adjusting unit 23.

The windowing unit 21 multiplies the MDCT coefficients of the residual signal by a windowing function for the butterfly IMDCT and butterfly IMDST and a gain $(\frac{1}{2}N)^{1/2}$. In the present embodiment, the windowing function $w_f[n]$ is expressed by the following equation.

$$w_f[n] = \sum_{m=-319}^{319} h_{norm}[320+m]\cos\left\{\frac{\pi(2n+1+oddflag-2N)m}{128N}\right\} \quad (2)$$

$$h[n] = \begin{cases} h_{qmf}[n] & \text{if } 0 \le n \le 127 \\ -h_{qmf}[n] & \text{if } 128 \le n \le 255 \\ h_{qmf}[n] & \text{if } 256 \le n \le 383 \\ -h_{qmf}[n] & \text{if } 384 \le n \le 511 \\ h_{qmf}[n] & \text{if } 512 \le n \le 639 \end{cases}$$

$$h_{norm}[n] = \frac{h[n]}{\sum_{n=0}^{639} h[n]}$$

$$oddflag = \begin{cases} 1 & \text{if } N/2 \text{ is odd}; \\ 0 & \text{if } N/2 \text{ is even} \end{cases}.$$

where (2N) represents the number of MDCT coefficients contained in the frequency band f to which the butterfly IMDET is applied. On the other hand, n represents the order of the coefficient on the time axis obtained as a result of the butterfly IMDET. The windowing unit 21 passes the MDCT coefficients of the residual signal multiplied by the windowing function and the gain to the inverse modified discrete exponential transform unit 22.

For each of the plurality of intervals into which the entire frequency band is divided, the inverse modified discrete exponential transform unit 22 performs the IMDET of the MDCT coefficients of the residual signal multiplied by the windowing function and the gain, and thereby computes the real and imaginary components of the QMF coefficients of the frequency corresponding to that interval.

For example, when the number of MDCT coefficients contained in each interval is 8, i.e., when N=4, the IMDET is expressed by the following equation using a transform matrix.

$$\begin{cases} QMF \text{ coefficients} \\ \text{(real parts)} \end{cases} \begin{cases} \begin{bmatrix} y1 \\ y2 \\ y3 \\ y4 \\ y5 \\ y6 \\ y7 \\ y8 \end{bmatrix} \\ \begin{bmatrix} y9 \\ y10 \\ y11 \\ y12 \\ y13 \\ y14 \\ y15 \\ y16 \end{bmatrix} \end{cases} = \begin{bmatrix} c_{0,0} & \cdots & c_{0,7} \\ \vdots & \ddots & \vdots \\ c_{7,0} & \cdots & c_{7,7} \\ s_{0,0} & \cdots & s_{0,7} \\ \vdots & \ddots & \vdots \\ s_{7,0} & \cdots & s_{7,7} \end{bmatrix} \begin{bmatrix} x1 \\ x2 \\ x3 \\ x4 \\ x5 \\ x6 \\ x7 \\ x8 \end{bmatrix} \quad (3)$$

$$c_{n,k} = \cos\left[\frac{\pi}{N}\left(n+\frac{1}{2}-\frac{N}{2}\right)\left(k-N+\frac{1}{2}\right)\right]$$

$$s_{n,k} = \sin\left[\frac{\pi}{N}\left(n+\frac{1}{2}-\frac{N}{2}\right)\left(k-N+\frac{1}{2}\right)\right]$$

where $x_i$ (i=1, 2, . . . , 8) represents each MDCT coefficient. Further, $y_j$ (i=1, 2, . . . , 8) represents the real component of each QMF coefficient, and $y_j$ (i=9, 10, . . . , 16) represents the imaginary component of each QMF coefficient. Each element $C_{n,k}$ in the transform matrix represents the basis function used for the IMDCT in the IMDET, and is a cosine function. On the other hand, each element $S_{n,k}$ in the transform matrix represents the basis function used for the IMDST in the IMDET, and is a sine function.

Figure 8:
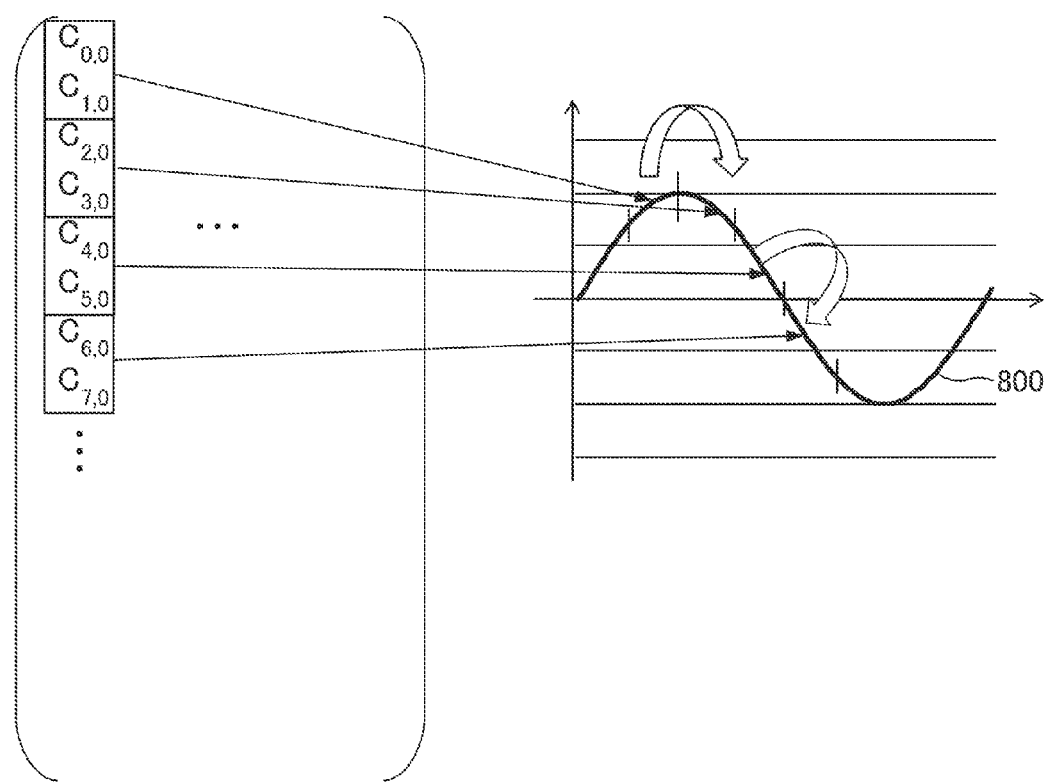
FIG. 8 is a diagram for explaining the periodicity of basis functions.

Since the basis functions used in the IMDET are trigonometric functions, as noted above, the basis functions have a periodicity. The periodicity will be described with reference to FIG. 8. In FIG. 8, graph 800 represents the basis function of the IMDCT for k=0. The basis function $c_{0,k}$ to $c_{7,k}$ contains half of the period of the cosine function; then, noting the first half interval of the basis function, i.e., from $c_{0,k}$ to $c_{3,k}$, it is seen that the interval $c_{0,k}$ to $c_{3,k}$ is symmetrical about the midpoint of that interval. Hence, $c_{0,k}=c_{3,k}$ and $c_{1,k}=c_{2,k}$ hold. For the second half interval $c_{4,k}$ to $c_{7,k}$ also, the basis function in absolute value is symmetrical about the midpoint of that interval, though the sign is inverted. Hence, $c_{4,k}=c_{7,k}$ and $c_{5,k}=c_{6,k}$ hold. Such symmetry also holds when k is not 0. Likewise, the basis function $s_{0,k}$ to $s_{7,k}$ of the IMDST is a sine function, and as can be seen from the equation (3), since it contains half of the period of the sine function, the interval $s_{0,k}$ to $s_{3,k}$ and the interval $s_{4,k}$ to $s_{7,k}$ are each symmetrical.

Accordingly, if the computation results are obtained for half of the rows in the transform matrix of the equation (3), the computation results can be used for the other half of the rows. More specifically, the inverse modified discrete exponential transform unit 22 need only perform computations only for the rows corresponding to either the first half or second half of the first half of the sequence of the QMF coefficients to be computed by the equation (3) and the rows corresponding to either the first half or second half of the second half of the sequence of the QMF coefficients. For example, y4 (the row of n=3) and y3 (the row of n=2) can be computed using the computation results of y1 (the row of n=0) and y2 (the row of n=1), respectively. Likewise, y8 (the row of n=7) and y7 (the row of n=6) can be computed using the computation results of y5 (the row of n=4) and y6 (the row of n=5), respectively.

Figure 9:
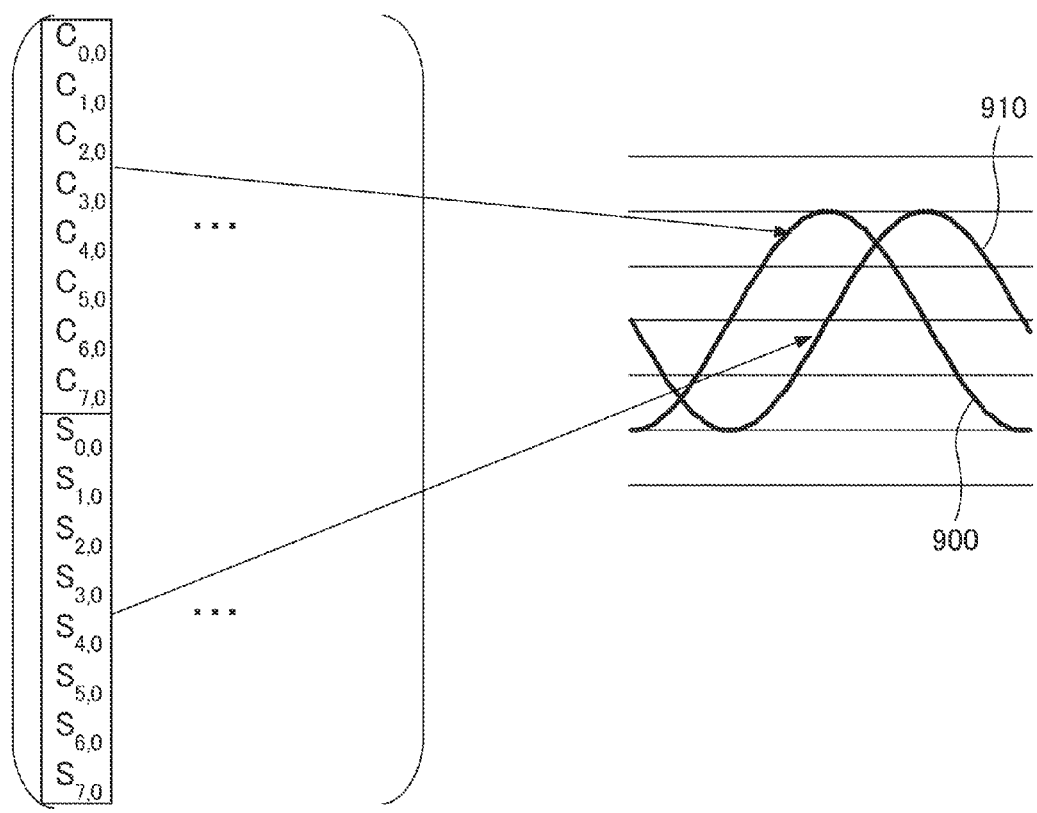
FIG. 9 is a diagram for explaining the difference between an IMDCT basis function and an IMDST basis function.

Referring to FIG. 9, the difference between the basis function of the IMDCT and the basis function of the IMDST will be described below. In FIG. 9, graph 900 represents the basis function of the IMDCT for k=0. On the other hand, graph 910 represents the basis function of the IMDST for k=0. The only difference between the basis function, $c_{0,k}$ to $c_{7,k}$, of the IMDCT and the basis function, $s_{0,k}$ to $s_{7,k}$, of the IMDST is that one is a cosine function and the other is a sine function. Therefore, noting the vertical columns in the transform matrix of the equation (3), it is seen that the basis function, $c_{0,k}$ to $c_{7,k}$, of the IMDCT and the basis function, $s_{0,k}$ to $s_{7,k}$, of the IMDST are identical in shape, the only difference being that the phase is shifted by one quarter of the period. Accordingly, the absolute values of the basis function, $s_{0,k}$ to $s_{7,k}$, of the IMDST are each equal to one of the absolute values of the basis function, $c_{0,k}$ to $c_{7,k}$, of the IMDCT. In other words, the inverse modified discrete exponential transform unit 22 need only perform computations only for the IMDCT (i.e., the upper half of the transform matrix) or the IMDST (i.e., the lower half of the transform matrix) in the equation (3); then, the results of the computations can be used for the other half. For example, using the computation results of the IMDCT performed on the first half of the sequence of the QMF coefficients to be computed by the equation (3), the inverse modified discrete exponential transform unit 22 can compute the IMDST of the second half of the sequence of the QMF coefficients. Conversely, using the computation results of the IMDCT performed on the second half of the sequence of the QMF coefficients to be computed by the equation (3), the inverse modified discrete exponential transform unit 22 can compute the IMDST of the first half of the sequence of the QMF coefficients. Similarly, using the computation results of the IMDST performed on the first half and the second half of the sequence of the QMF coefficients, the inverse modified discrete exponential transform unit 22 can compute the IMDCT of the second half and the first half of the sequence of the QMF coefficients, respectively.

Accordingly, by performing multiplications with the MDCT coefficients only on one quarter of the elements contained in the matrix of the equation (3), the inverse modified discrete exponential transform unit 22 can accomplish the computation of the IMDET.

To compute the QMF coefficients by performing multiplications with the MDCT coefficients only on some of the elements contained in the matrix of the equation (3) as described above, the inverse modified discrete exponential transform unit 22 includes a storage unit 31, a local multiplication unit 32, and a coefficient computing unit 33.

The storage unit 31 includes, for example, a nonvolatile read-only memory circuit and a readable/writable volatile memory circuit. Then, for each of the various lengths of interval to which the IMDET is applied, the storage unit 31 stores a table representing the elements of the basis functions by which the MDCT coefficients are multiplied. Each table stores the values of the basis functions used to compute either the first half or the second half of the first half of the interval containing the QMF coefficients to be computed, and the values of the basis functions used to compute either the first half or the second half of the second half of that interval. The values of the basis functions may be the values of the basis functions for the IMDCT, i.e., the values used to compute the real components of the QMF coefficients, or may be the values of the basis functions for the IMDST, i.e., the values used to compute the imaginary components of the QMF coefficients. For example, the table for the case where the length of interval to which the IMDET is applied is 8, that is, N=4, as indicated by the equation (3), stores the elements of the basis functions ($c_{0,k}$, $c_{1,k}$, $c_{4,k}$, and $c_{5,k}$) in the first, second, fifth, and sixth rows of the matrix in the equation (3). When the length of interval to which the IMDET is applied is 4, i.e., when N=2, the matrix of the basis functions has elements arranged in eight rows and four columns. Of these elements, the elements in the upper four rows are the IMDCT basis functions $c_{n,k}$ (n=0, . . . , 3, k=0, . . . , 3), and the elements in the lower four rows are the IMDST basis functions $s_{n,k}$ (n=0, . . . , 3, k=0, . . . , 3). The table for N=2 stores the elements of the basis functions ($c_{0,k}$ and $c_{2,k}$) carried in the first and third rows.

The storage unit 31 also stores intermediate computed values from the local multiplication unit 32 so that the values can be used by the coefficient computing unit 33.

The local multiplication unit 32 retrieves the desired table from among the tables stored in the storage unit 31 according to the frame length of the residual signal. The local multiplication unit 32 multiplies the element of each basis function stored in the table by the corresponding MDCT coefficient. Then, for each row of the transform matrix on which the multiplications are done, the local multiplication unit 32 computes the sum $\Sigma c_{i,2k} * x[2k+1]$ (k=0, 1, . . . , 2N-1) of the products of the MDCT coefficients and the elements in the odd-numbered columns and the sum $\Sigma c_{i,2k+1} * x[2k+1]$ of the products of the MDCT coefficients and the elements in the even-numbered columns. The local multiplication unit 32 stores these sums as the intermediate computed values in the storage unit 31.

Figure 10:
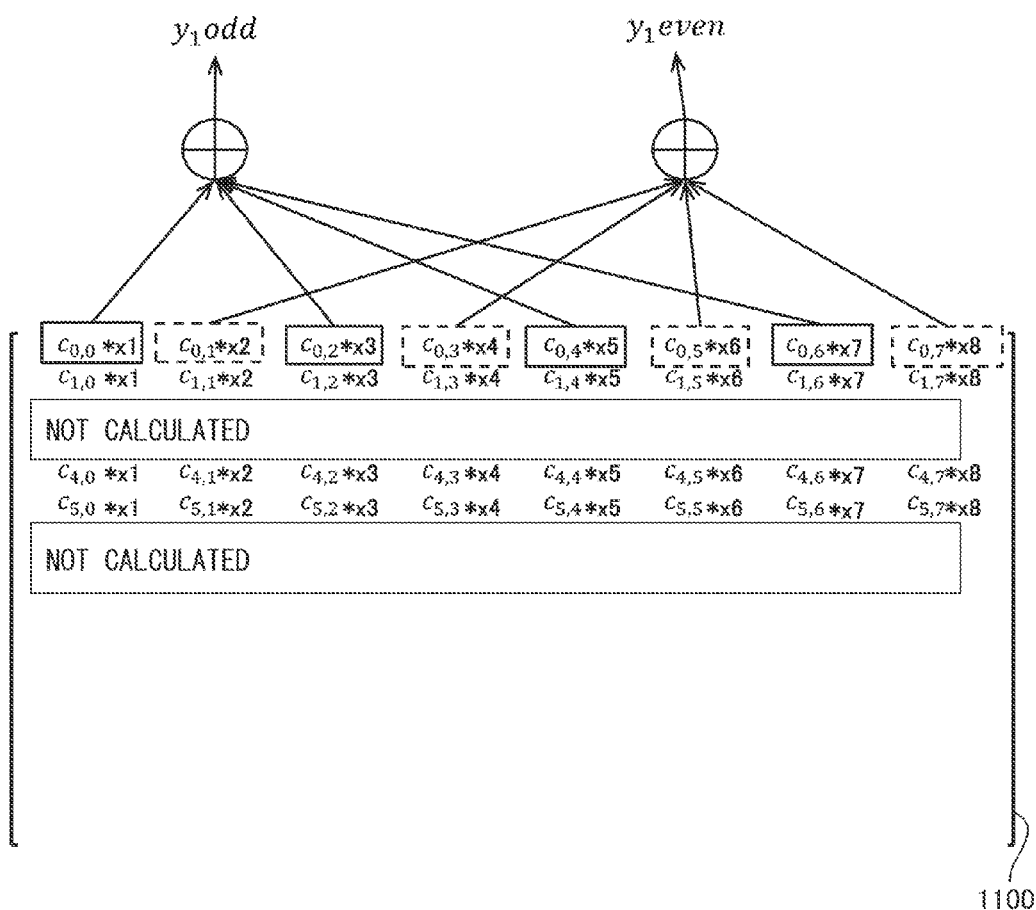
FIG. 10 is a diagram for explaining the processing performed by the local multiplication unit.

FIG. 10 is a diagram for explaining the processing that the local multiplication unit 32 performs when the length of interval is 8 (N=4). In the matrix 1000 containing the products of the transform matrix and the MDCT coefficient sequence, the local multiplication unit 32 calculates the elements $c_{i,2k} * x[2k+1]$ in the odd-numbered columns enclosed by solid lines for each of the first, second, fifth, and sixth rows. Then, the local multiplication unit 32 computes the sum $\Sigma c_{i,2k} * x[2k+1]$ of these elements as $y_i$odd. Further, the local multiplication unit 32 calculates the elements $c_{i,2k+1} * x[2(k+1)]$ in the even-numbered columns enclosed by dashed lines. Then, the local multiplication unit 32 computes the sum $\Sigma c_{i,2k+1} * x[2(k+1)]$ of these elements as $y_i$even.

The coefficient computing unit 33 computes the real and imaginary components of each QMF coefficient by a butterfly operation using the intermediate computed values stored in the storage unit 31.

Figure 11:
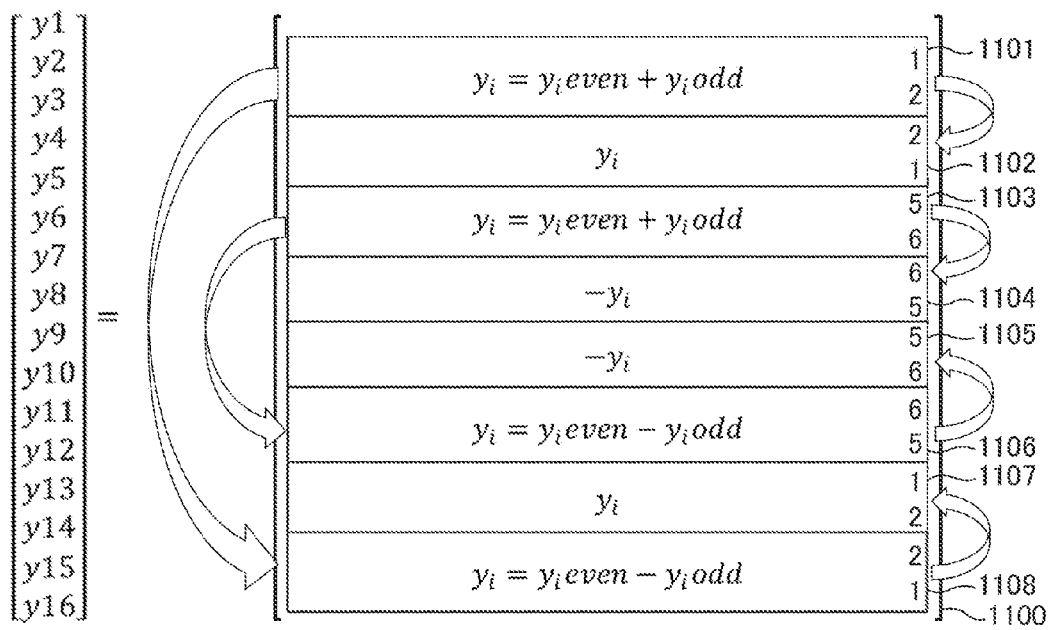
FIG. 11 is a diagram for explaining one example of a butterfly operation performed by a coefficient computing unit.

FIG. 11 is a diagram for explaining how the butterfly operation is performed by the coefficient computing unit 33. In the illustrated example, of a plurality of subintervals among which the QMF coefficient sequence is divided into four quarters so that the values of the basis functions used to compute each QMF coefficient are symmetrically placed, the intermediate computed values for the first and third subintervals are already obtained from the local multiplication unit 32. In other words, of the eight blocks into which the matrix 1100 containing the products of the IMDET transform matrix and the MDCT coefficients has been equally divided across the vertical direction, the sum $y_i$odd of the elements in the odd-numbered columns and the sum $y_i$even of the elements in the even-numbered columns are already computed for each row in the first and third blocks 1101 and 1103. The numbers indicated at the right edge of each block indicate the row numbers for which the intermediate computed values to be used for the computation of the corresponding rows have been calculated by the local multiplication unit 32.

For each row in the blocks 1101 and 1103, the coefficient computing unit 33 can compute the real component of the corresponding QMF coefficient by simply adding the sum $y_i$odd of the elements in the odd-numbered columns to the sum $y_i$even of the elements in the even-numbered columns.

On the other hand, the value of the QMF coefficient corresponding to each row in the second block 1102 is symmetrical in position to the value of the QMF coefficient corresponding to each row in the first block 1101. For example, when N=4, each block contains two rows. As a result, the real component y3 of the QMF coefficient corresponding to the upper row in the block 1102, i.e., the third row in the matrix 1100, is equal to the real component y2 of the QMF coefficient corresponding to the lower row in the block 1101, i.e., the second row in the matrix 1100. Likewise, the real component y4 of the QMF coefficient corresponding to the lower row in the block 1102, i.e., the fourth row in the matrix 1100, is equal to the real component y1 of the QMF coefficient corresponding to the upper row in the block 1101, i.e., the first row in the matrix 1100. Accordingly, the coefficient computing unit 33 substitutes the real component of the QMF coefficient corresponding to each row in the block 1101 for the real component of the QMF coefficient in the corresponding row in the block 1102. For example, when N=4, y3=y2 and y4=y1.

Similarly, the value of the QMF coefficient corresponding to each row in the fourth block 1104 is symmetrical in position to the value of the QMF coefficient corresponding to each row in the third block 1103, but the sign of the value is inverted. Accordingly, the coefficient computing unit 33 inverts the sign of the real component of the QMF coefficient corresponding to each row in the block 1103, and substitutes the sign-inverted real component for the real component of the QMF coefficient in the corresponding row in the block 1104. For example, when N=4, y8=−y5 and y7=−y6.

Further, since the IMDCT basis function and the IMDST basis function are shifted in phase by one-quarter of the period relative to each other, the coefficient computing unit 33 can compute the value of each row in the eighth block 1108 by using the intermediate computed values of the corresponding row in the first block 1101. When N=4, the imaginary component y16 of the QMF coefficient corresponding to the lower row in the eighth block 1108, i.e., the 16th row in the matrix 1100, is equal to the value ($y_1$even−$y_1$odd) obtained by subtracting the sum $y_1$odd of the elements in the odd-numbered columns in the upper row y1 in the block 1101 from the sum $y_1$even of the elements in the even-numbered columns. Similarly, the imaginary component y15 of the QMF coefficient corresponding to the 15th row in the matrix 1100 is equal to the value ($y_2$even−$y_2$odd) obtained by subtracting the sum $y_2$odd of the elements in the odd-numbered columns in the lower row y2 in the block 1101 from the sum $y_2$even of the elements in the even-numbered columns. Further, the coefficient computing unit 33 can compute the imaginary component of the QMF coefficient corresponding to each row in the sixth block 1106 by using the intermediate computed values of the corresponding row in the third block 1103. More specifically, the imaginary component y12 of the QMF coefficient corresponding to the 12th row in the matrix 1100 is equal to the value ($y_5$even−$y_5$odd) obtained by subtracting the sum $y_5$odd of the elements in the odd-numbered columns in the upper row y5 in the block 1103 from the sum $y_5$even of the elements in the even-numbered columns. Similarly, the imaginary component y11 of the QMF coefficient corresponding to the 11th row in the matrix 1100 is equal to the value ($y_6$even−$y_6$odd) obtained by subtracting the sum $y_6$odd of the elements in the odd-numbered columns in the lower row y6 in the block 1103 from the sum $y_6$even of the elements in the even-numbered columns.

Further, the value of the QMF coefficient corresponding to each row in the seventh block 1107 is symmetrical in position to the value of the QMF coefficient corresponding to each row in the eighth block 1108. For example, when N=4, the imaginary component y13 of the QMF coefficient corresponding to the upper row in the block 1107, i.e., the 13th row in the matrix 1100, is equal to the imaginary component y16 of the QMF coefficient corresponding to the lower row in the block 1108, i.e., the 16th row in the matrix 1100. Likewise, the imaginary component y14 of the QMF coefficient corresponding to the lower row in the block 1107, i.e., the 14th row in the matrix 1100, is equal to the imaginary component y15 of the QMF coefficient corresponding to the 15th row in the matrix 1100.

Similarly, the value of the QMF coefficient corresponding to each row in the fifth block 1105 is symmetrical in position to the value of the QMF coefficient corresponding to each row in the sixth block 1106, but the sign of the value is inverted. Accordingly, the coefficient computing unit 33 inverts the sign of the imaginary component of the QMF coefficient corresponding to each row in the block 1106, and substitutes the thus sign-inverted imaginary component for the imaginary component of the QMF coefficient in the corresponding row in the block 1105. For example, when N=4, y9=−y12 and y10=−y11.

Figure 12:
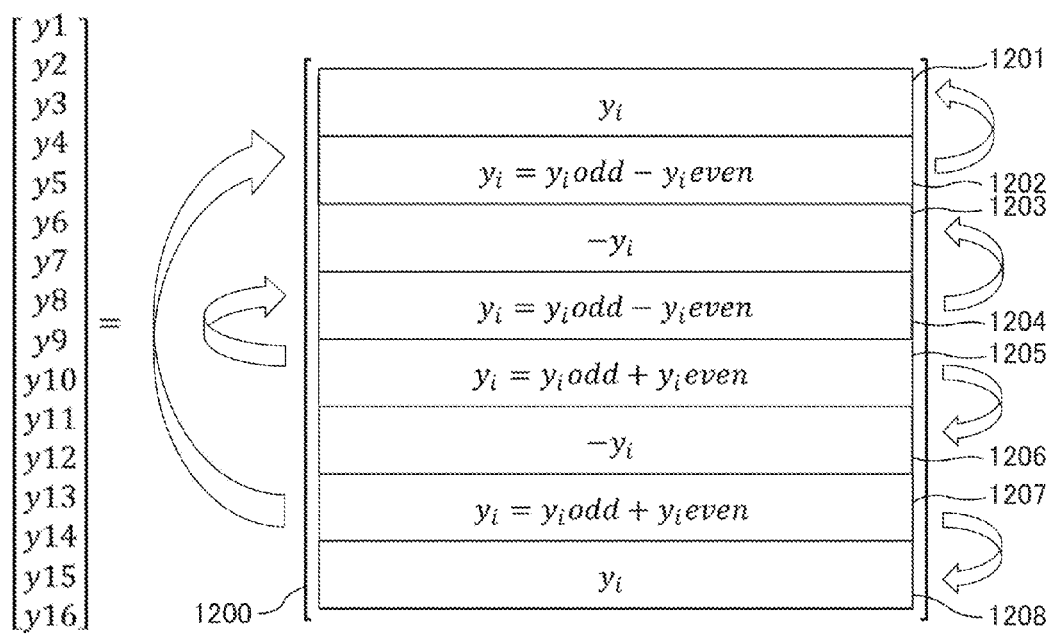
FIG. 12 is a diagram for explaining another example of a butterfly operation performed by the coefficient computing unit.

FIG. 12 is a diagram for explaining the butterfly operation according to a modified example when intermediate computed values are calculated by the local multiplication unit 32 for the fifth and seventh blocks among the eight blocks into which the matrix 1200 containing the products of the IMDET transform matrix and the MDCT coefficients has been equally divided across the vertical direction.

In this case, since the fifth block 1205 and the seventh block 1207 each correspond to IMDST, the basis functions are sine functions. Accordingly, the sum $\Sigma s_{i,2k}*x[2k+1]$ of the elements in the odd-numbered columns is computed as $y_i$odd by the local multiplication unit 32 for each of the 9th, 10th, 13th, and 14th rows in the matrix of the products of the transform matrix and the MDCT coefficients. Similarly, the sum $\Sigma s_{i,2k+1}*x[2(k+1)]$ of the elements in the even-numbered columns is computed as $y_i$even by the local multiplication unit 32. For each row in the blocks 1205 and 1207, the coefficient computing unit 33 can compute the imaginary component yi (i=9, 10, 13, 14) of the corresponding QMF coefficient by simply adding the sum $y_i$odd of the elements in the odd-numbered columns to the sum $y_i$even of the elements in the even-numbered columns.

On the other hand, the value of the QMF coefficient corresponding to each row in the eighth block 1208 is symmetrical in position to the value of the QMF coefficient corresponding to each row in the seventh block 1207. Accordingly, when N=4, for example, the coefficient computing unit 33 computes the imaginary components y15 and y16 of the QMF coefficients corresponding to the respective rows in the block 1208 as y15=y14 and y16=y13, respectively.

Similarly, the value of the QMF coefficient corresponding to each row in the sixth block 1206 is symmetrical in position to the value of the QMF coefficient corresponding to each row in the fifth block 1205, but the sign of the value is inverted. Accordingly, when N=4, for example, the coefficient computing unit 33 computes the imaginary components y11 and y12 of the QMF coefficients corresponding to the respective rows in the block 1206 as y11=−y10 and y12=−y9, respectively.

Further, since the IMDCT basis function and the IMDST basis function are shifted in phase by one-quarter of the period relative to each other, the coefficient computing unit 33 can compute the value of each row in the second block 1202 by using the intermediate computed values of the corresponding row in the seventh block 1207. When N=4, the real component y4 of the QMF coefficient corresponding to the lower row in the second block 1202, i.e., the fourth row in the matrix 1200, is equal to the value $(y_{13}\text{odd}-y_{13}\text{even})$ obtained by subtracting the sum $y_{13}\text{even}$ of the elements in the even-numbered columns in the upper row y13 in the block 1207 from the sum $y_{13}\text{odd}$ of the elements in the odd-numbered columns. Similarly, the real component y3 of the QMF coefficient corresponding to the third row in the matrix 1200 is equal to the value $(y_{14}\text{odd}-y_{14}\text{even})$ obtained by subtracting the sum $y_{14}\text{even}$ of the elements in the even-numbered columns in the lower row y14 in the block 1207 from the sum $y_{14}\text{odd}$ of the elements in the odd-numbered columns. Further, the coefficient computing unit 33 can compute the real component of the QMF coefficient corresponding to each row in the fourth block 1204 by using the intermediate computed values of the corresponding row in the fifth block 1205. More specifically, the real component y7 of the QMF coefficient corresponding to the seventh row in the matrix 1200 is equal to the value $(y_{10}\text{odd}-y_{10}\text{even})$ obtained by subtracting the sum $y_{10}\text{even}$ of the elements in the even-numbered columns in the lower row y10 in the block 1205 from the sum $y_{10}\text{odd}$ of the elements in the odd-numbered columns. Similarly, the real component y8 of the QMF coefficient corresponding to the eighth row in the matrix 1200 is equal to the value $(y_9\text{odd}-y_9\text{even})$ obtained by subtracting the sum $y_9\text{even}$ of the elements in the even-numbered columns in the upper row y9 in the block 1205 from the sum $y_9\text{odd}$ of the elements in the odd-numbered columns.

Further, the value of the QMF coefficient corresponding to each row in the first block 1201 is symmetrical in position to the value of the QMF coefficient corresponding to each row in the second block 1202. Accordingly, when N=4, for example, the coefficient computing unit 33 computes the real components y1 and y2 of the QMF coefficients corresponding to the respective rows in the block 1201 as y1=y4 and y2=y3, respectively.

Similarly, the value of the QMF coefficient corresponding to each row in the third block 1203 is symmetrical in position to the value of the QMF coefficient corresponding to each row in the fourth block 1204, but the sign of the value is inverted. Accordingly, when N=4, for example, the coefficient computing unit 33 computes the real components y5 and y6 of the QMF coefficients corresponding to the respective rows in the block 1203 as y5=−y8 and y6=−y7, respectively.

As described above, to compute the real components in the first half interval of the QMF coefficient sequence and the imaginary components in the second half, the products of the basis functions and the corresponding MDF coefficients need be calculated only for the first half or second half of either one of the first and second half intervals. Similarly, to compute the imaginary components in the first half interval of the sequence of the QMF coefficients and the real components in the second half, the products of the basis functions and the corresponding MDF coefficients need be calculated only for the first half or second half of either one of the first and second half intervals.

The coefficient computing unit 33 passes the real and imaginary components of the QMF coefficients to the coefficient adjusting unit 23.

The coefficient adjusting unit 23 obtains the QMF coefficients of the residual signal by combining the real components and imaginary components of the QMF coefficients output from the inverse modified discrete exponential transform unit 22. More specifically, the coefficient adjusting unit 23 computes each QMF coefficient in accordance with the following equation.

$$z[n, f] = \{X[n, f] + jY[n, f]\} \tag{4}$$

$$Z = \left[\exp\left(-\frac{j\pi}{256}(258\cdot 0 + 385)\right)z[n, 1]\exp\left(-\frac{j\pi}{256}(258\cdot 1 + 385)\right)\right.$$

$$\left. z[n, 2] \ldots \exp\left(-\frac{j\pi}{256}(258\cdot(f-1) + 385)\right)z[n, f]\right]$$

where X[n,f] is the real component of the QMF coefficient obtained by the butterfly IMDCT of the MDCT coefficient, and Y[n,f] is the imaginary component of the QMF coefficient obtained by the butterfly IMDST of the MDCT coefficient. Z[n,f] is the resulting QMF coefficient. f denotes the frequency band to which the butterfly IMDCT and butterfly IMDST are applied.

Figure 13:
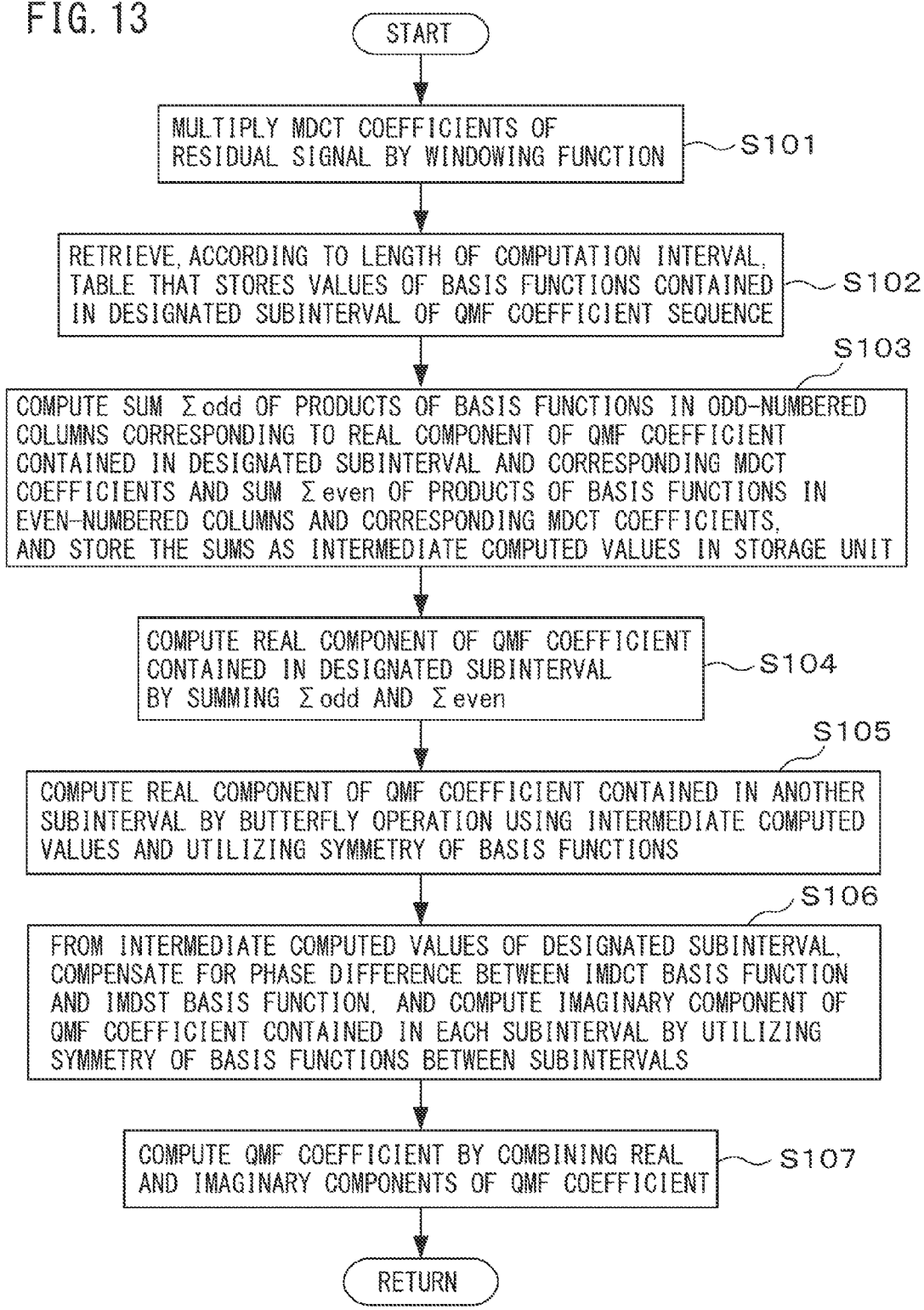
FIG. 13 is an operation flowchart of an orthogonal transform process.

FIG. 13 is an operation flowchart illustrating the orthogonal transform process performed by the orthogonal transform unit 16. The orthogonal transform unit 16 performs the orthogonal transform process in accordance with the following flowchart for each computation interval corresponding to one frequency band.

The windowing unit 21 in the orthogonal transform unit 16 multiplies the MDCT coefficients of the residual signal by the windowing function and the gain (step S101). Then, the windowing unit 21 passes the MDCT coefficients, each multiplied by the windowing function and the gain, to the local multiplication unit 32 in the inverse modified discrete exponential transform unit 22 contained in the orthogonal transform unit 16.

The local multiplication unit 32 accesses the storage unit 31 to retrieve, according to the length of the computation interval, a table that stores the values of the basis functions contained in a designated one of the subintervals among which the QMF coefficient sequence is divided so that the values of the basis functions used to compute the QMF coefficients are symmetrically placed (step S102). Then, the local multiplication unit 32 computes the sum of the products of the basis functions in the odd-numbered columns corresponding to the real component of the QMF coefficient contained in the designated subinterval and the corresponding MDCT coefficients and the sum of the products of the basis functions in the even-numbered columns and the corresponding MDCT coefficients. The local multiplication unit 32 stores the results of the computations as the intermediate computed values in the storage unit 31 (step S103).

For the designated subinterval, the coefficient computing unit 33 computes the real component of the QMF coefficient contained in that subinterval by summing the sum of the products of the basis functions in the odd-numbered columns and the corresponding MDCT coefficients with the sum of the products of the basis functions in the even-numbered columns and the corresponding MDCT coefficients (step S104). Further, for a subinterval other than the designated subinterval, the coefficient computing unit 33 computes the real component of the QMF coefficient by a butterfly operation using the intermediate computed values stored in the storage unit 31 and utilizing the symmetry of the basis functions (step S105). Further, from the intermediate computed values of the designated subinterval, the coefficient computing unit 33 compensates for the phase difference between the IMDCT basis function and the IMDST basis function, and computes the imaginary component of the QMF coefficient contained in each subinterval by utilizing the symmetry of the basis functions between the subintervals (step S106).

The coefficient adjusting unit 23 in the orthogonal transform unit 16 obtains each QMF coefficient by combining the real and imaginary components of the QMF coefficient (step S107). Then, the orthogonal transform unit 16 terminates the orthogonal transform process. In the above step S103, the local multiplication unit 32 may compute the sum of the products of the basis functions in the odd-numbered columns corresponding to the imaginary component of the QMF coefficient contained in the designated subinterval and the corresponding MDCT coefficients and the sum of the products of the basis functions in the even-numbered columns and the corresponding MDCT coefficients, and may take them as the intermediate computed values. In this case, the coefficient computing unit 33 computes the imaginary component of the QMF coefficient contained in each subinterval in the above steps S104 and S105, and computes the real component of the QMF coefficient contained in each subinterval in the above step S106.

Figure 14:
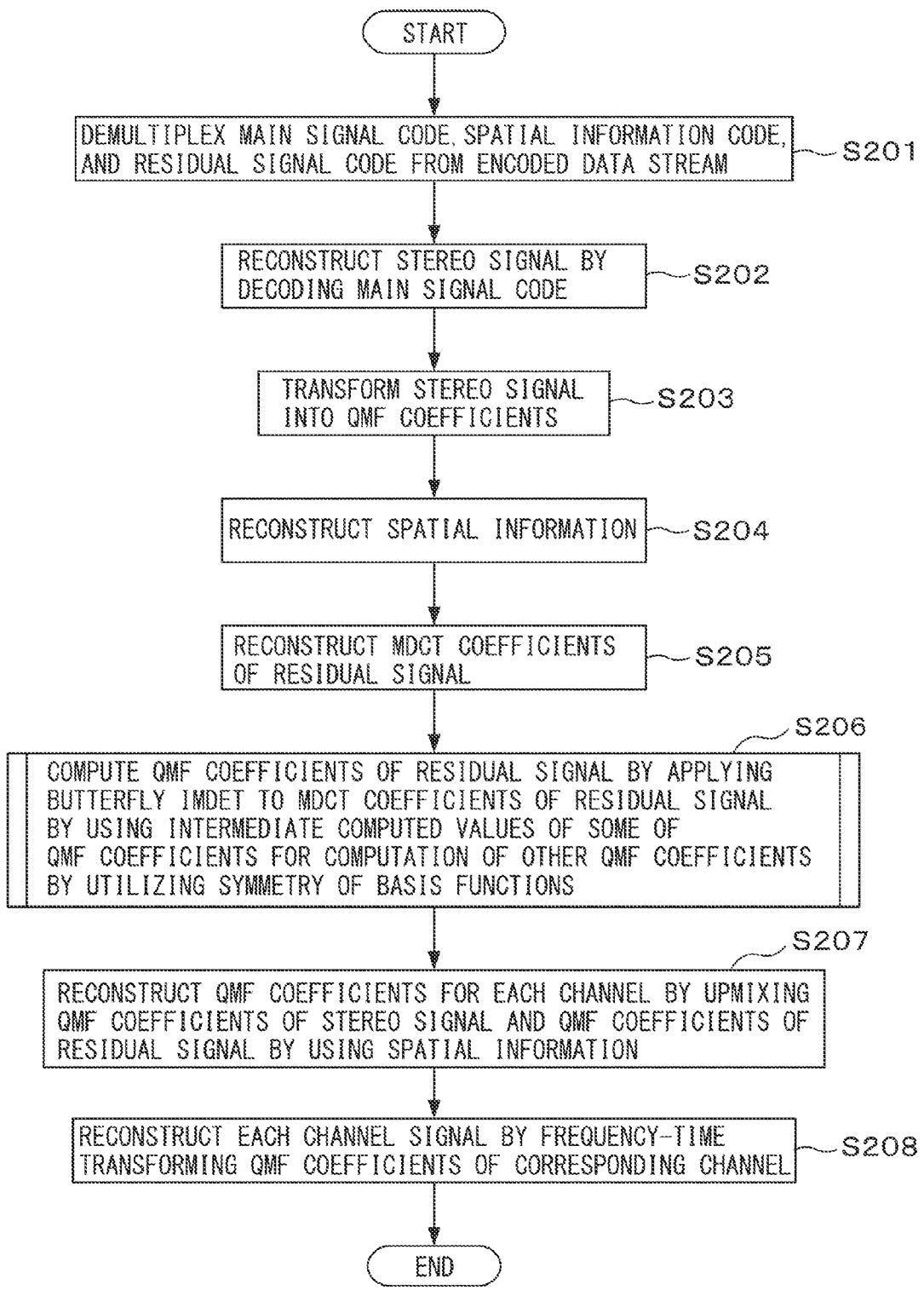
FIG. 14 is an operation flowchart of an audio decoding process which is performed by the audio decoding apparatus.

FIG. 14 is an operation flowchart of the audio decoding process performed by the audio decoding apparatus 1. The audio decoding apparatus 1 decodes the audio signal on a frame-by-frame basis in accordance with the following flowchart.

The demultiplexing unit 11 demultiplexes the main signal code such as the AAC code and SBR code, the spatial information code, and the residual signal code from the encoded data stream (step S201). The main signal decoding unit 12 reconstructs the stereo signal by decoding the main signal code received from the demultiplexing unit 11 (step S202). The time-frequency transform unit 13 transforms the stereo signal into QMF coefficients in the time-frequency domain by applying a QMF filter bank (step S203).

On the other hand, the spatial information decoding unit 14 reconstructs the spatial information by decoding the spatial information code received from the demultiplexing unit 11 (step S204). The spatial information decoding unit 14 passes the reconstructed spatial information to the upmixing unit 17.

The residual signal decoding unit 15 reconstructs the MDCT coefficients of the residual signal by decoding the residual signal code received from the demultiplexing unit 11 (step S205). The orthogonal transform unit 16 computes the QMF coefficients of the residual signal by applying the butterfly IMDET to the MDCT coefficients of the residual signal by using the intermediate computed values of some of the QMF coefficients for computation of other QMF coefficients by utilizing the symmetry of the basis functions (step S206).

The upmixing unit 17 reconstructs the QMF coefficients for each channel of the original audio signal by upmixing the QMF coefficients of the stereo signal and the QMF coefficients of the residual signal by using the spatial information (step S207). The frequency-time transform unit 18 reconstructs each channel of the audio signal by frequency-time transforming the QMF coefficients of the corresponding channel (step S208).

Then, the audio decoding apparatus terminates the audio decoding process.

As has been described above, the orthogonal transform apparatus according to the present embodiment can reduce the amount of computation of the butterfly IMDET used to transform the MDCT coefficients into the QMF coefficients, by a factor of 4 by exploiting the symmetry of the basis functions. As a result, the audio decoding apparatus incorporating the above orthogonal transform apparatus can reduce the amount of computation needed to transform the MDCT coefficients of the residual signal into the QMF coefficients.

Next, an orthogonal transform apparatus according to a second embodiment will be described.

When the IMDET is performed without applying any speed enhancing techniques, the amount of computation of the IMDET is of the order of the square of the number of MDCT coefficients contained in the computation interval. As a result, in the foregoing embodiment, while the amount of computation of the IMDET can be reduced by a factor of 4, the amount of computation itself is of the order of the square of the number of MDCT coefficients contained in the computation interval.

On the other hand, methods are known that perform IMDCT and IMDST by using fast Fourier transform (FFT). One such method is disclosed, for example, in "Regular FFT-Related Transform Kernels for DCT/DST-Based Polyphase Filter Banks" by Rolf Gluth, IEEE Acoustics, Speech, and Signal Processing, ICASSP-91, 1991, vol. 3, pp. 2205-2208. According to the method disclosed in the above literature, IMDCT and IMDST can be implemented by performing FFT in both the pre-processing and post-processing that involve rotating the input signal sequence in the complex plane. The amount of FFT computation is of the order of N log N when the number, N, of input signal points is a power of 2. Accordingly, when the number of MDCT coefficients contained in the IMDET computation interval is a power of 2, the effect of reducing the amount of computation by performing the IMDET using FFT is greater as the number of MDCT coefficients is larger.

In view of the above, in the orthogonal transform apparatus according to the second embodiment, switching between the IMDET method according to the foregoing embodiment and the IMDET method that uses FFT is made based on the length of the computation interval to which the IMDET is applied.

Figure 15:
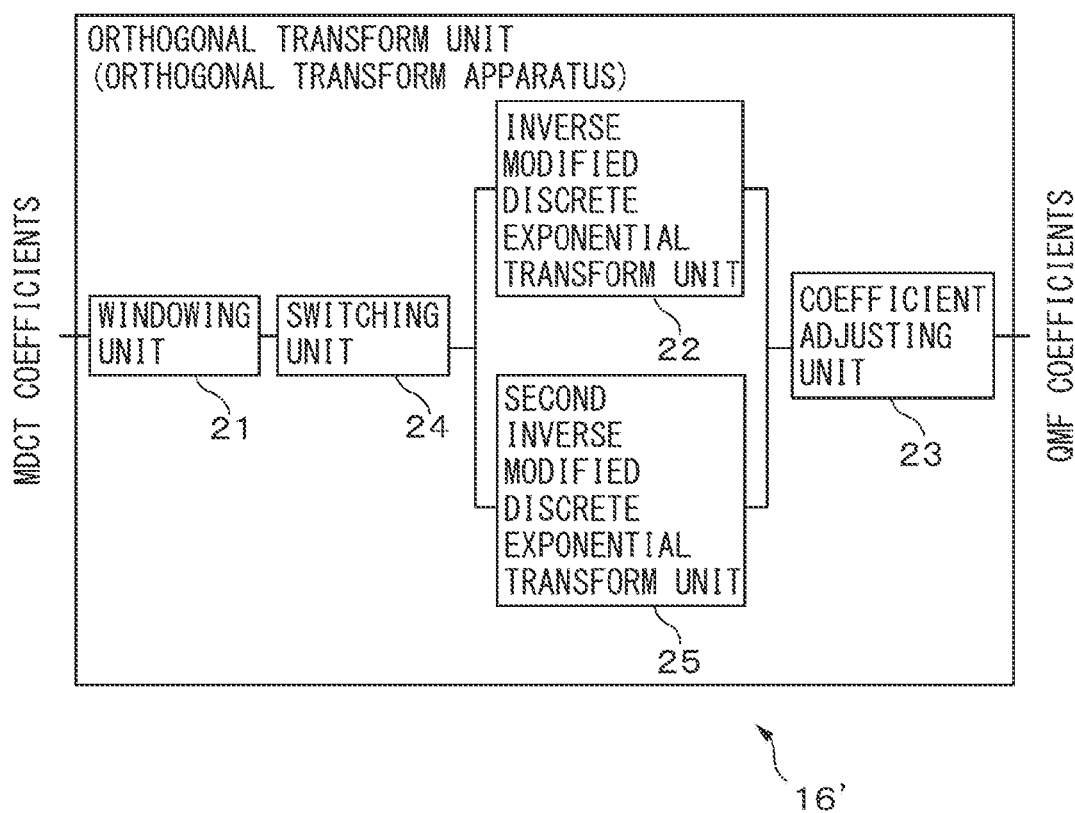
FIG. 15 is a block diagram of an orthogonal transform apparatus according to a second embodiment.

FIG. 15 is a block diagram of the orthogonal transform apparatus 16' according to the second embodiment. The orthogonal transform apparatus 16' includes a windowing unit 21, a switching unit 24, an inverse modified discrete exponential transform unit 22, a second inverse modified discrete exponential transform unit 25, and a coefficient adjusting unit 23. In FIG. 15, the component elements of the orthogonal transform apparatus 16' are designated by the same reference numerals as those used to designate the corresponding component elements of the orthogonal transform apparatus 16 according to the first embodiment illustrated in FIG. 7. The orthogonal transform apparatus 16' according to the second embodiment differs from the orthogonal transform apparatus 16 according to the first embodiment by the inclusion of the switching unit 24 and the second inverse modified discrete exponential transform unit 25. The following description therefore deals with the switching unit 24 and the second inverse modified discrete exponential transform unit 25.

Based on the length of the computation interval to which the IMDET is applied, the switching unit 24 selects either the inverse modified discrete exponential transform unit 22 which performs the IMDET by exploiting the symmetry of the basis functions or the second inverse modified discrete exponential transform unit 25 which performs the IMDET by using FFT.

Figure 16:
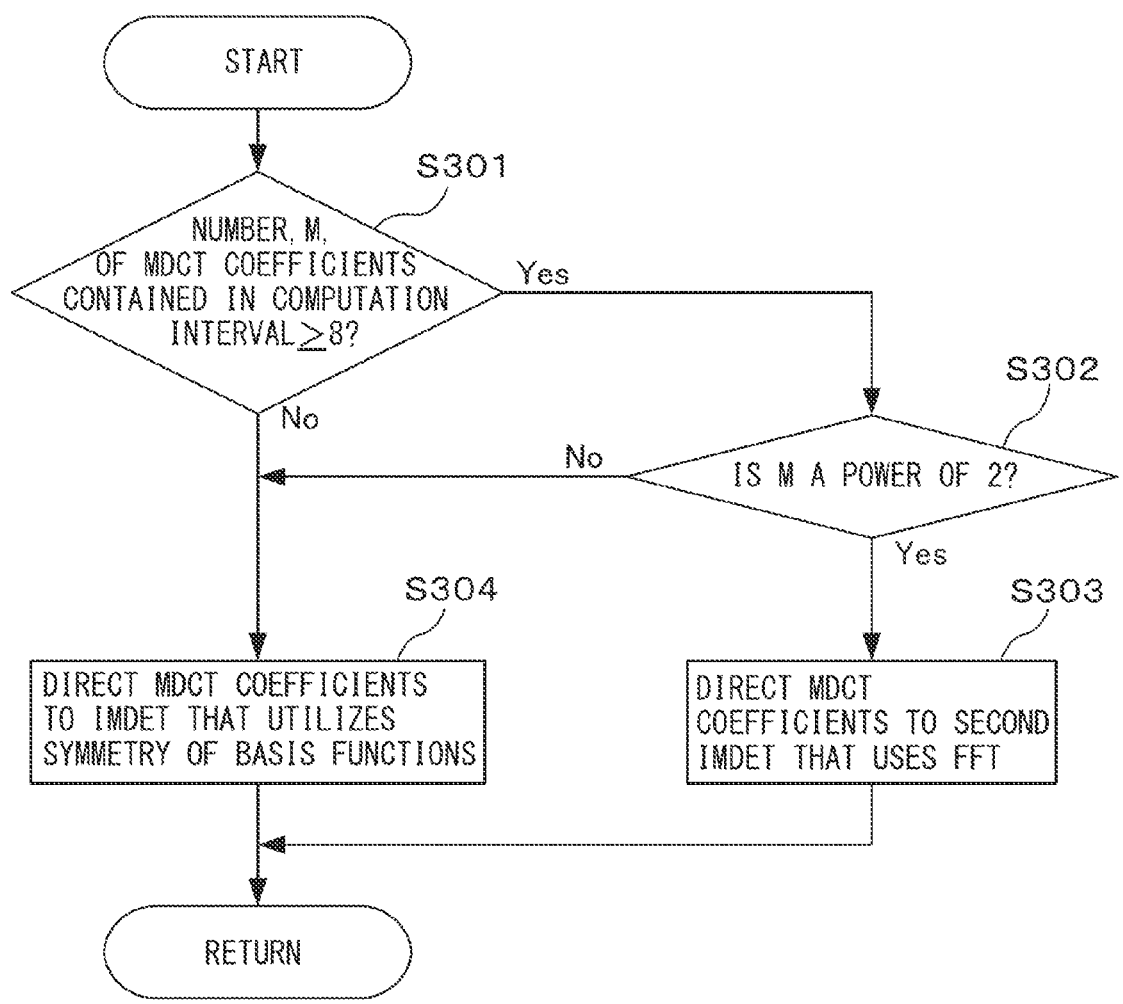
FIG. 16 is an operation flowchart of a switching process.

FIG. 16 is an operation flowchart of the switching process performed by the switching unit 24. The switching unit 24 determines whether or not the number, M, of MDCT coefficients contained in the IMDET computation interval is equal to or larger than 8 (step S301). If the number, M, of MDCT coefficients is equal to or larger than 8 (Yes in step S301), the switching unit 24 then determines whether the number, M, of MDCT coefficients is a power 2 or not (step S302). If the number, M, of MDCT coefficients is a power 2 (Yes in step S302), the switching unit 24 directs the MDCT coefficients to the second inverse modified discrete exponential transform unit 25 that uses FFT (step S303).

On the other hand, if the number, M, of MDCT coefficients is not a power 2 (No in step S302), or if the number M is smaller than 8 (No in step S301), the switching unit 24 directs the MDCT coefficients to the inverse modified discrete exponential transform unit 22 that exploits the symmetry of the basis functions (step S304). After step S303 or S304, the switching unit 24 terminates the switching process.

The second inverse modified discrete exponential transform unit 25 performs the IMDET of the input MDCT coefficients by using FFT.

Figure 17:
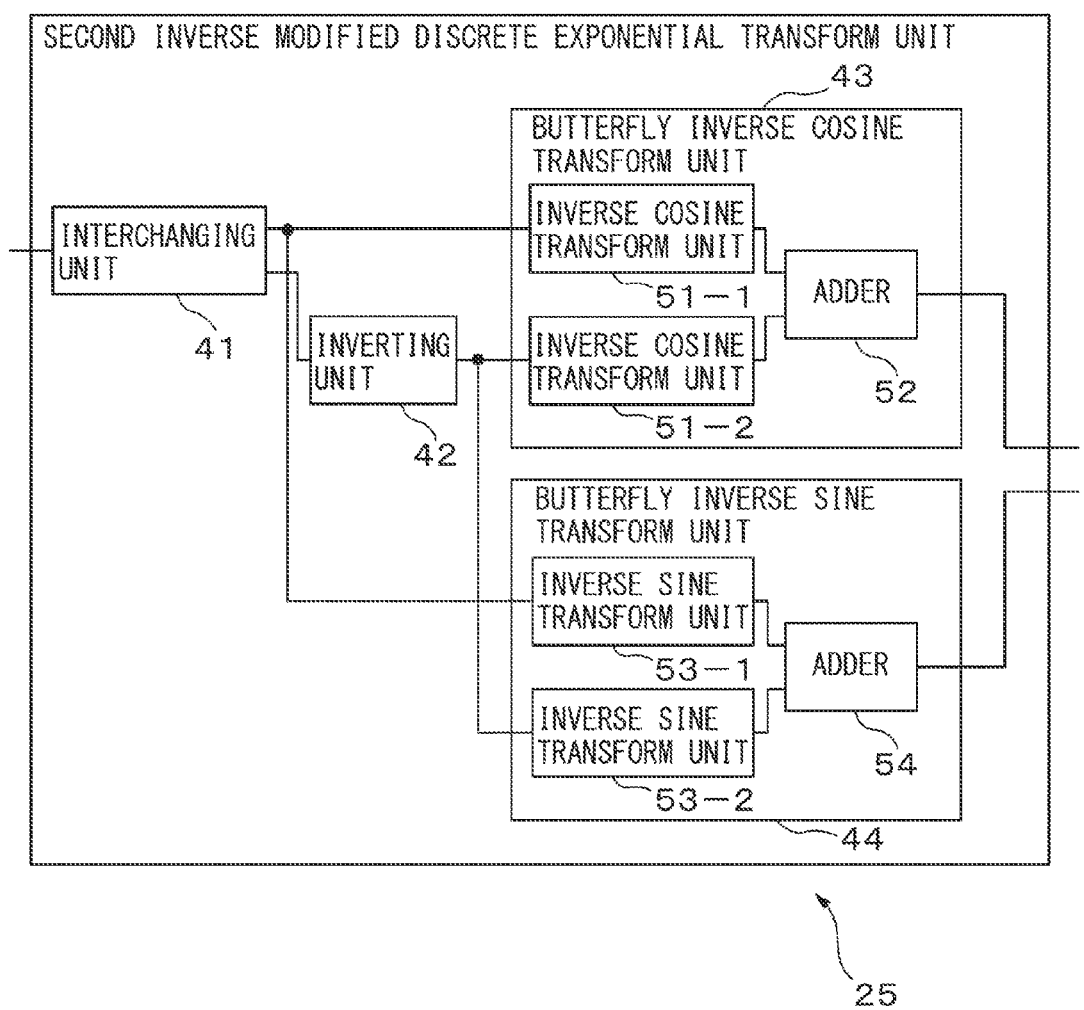
FIG. 17 is a block diagram of a second inverse modified discrete exponential transform unit.

FIG. 17 is a block diagram of the second inverse modified discrete exponential transform unit 25. The second inverse modified discrete exponential transform unit 25 includes an interchanging unit 41, an inverting unit 42, a butterfly inverse cosine transform unit 43, and a butterfly inverse sine transform unit 44. In the present embodiment, to reduce the amount of computation, the butterfly inverse cosine transform unit 43 and the butterfly inverse sine transform unit 44 employ the method of performing the IMDCT and IMDST by using FFT.

There are differences such as described below between the butterfly IMDCT and butterfly IMDST and the conventional IMDCT and conventional IMDST.

Generally, the butterfly IMDCT is expressed by the following equation.

$$ButterflyIMDCT[n] = \sqrt{\frac{1}{2N}} w[n] \sum_{k=0}^{2N-1} x[k] \cdot \cos\left(\frac{\pi}{N}(n+n_0)\left(k - N + \frac{1}{2}\right)\right) \quad 0 \le n < 2N \tag{5}$$

On the other hand, the conventional IMDCT is expressed by the following equation.

$$IMDCT[n] = \sqrt{\frac{2}{N}} w[n] \sum_{k=0}^{N-1} x[k] \cdot \cos\left(\frac{\pi}{N}(n+n_0)\left(k + \frac{1}{2}\right)\right) \quad 0 \le n < 2N \tag{6}$$

where x[k] (k=0, 1, 2, ..., 2N-1) are MDCT coefficients. As is apparent from the above equations (5) and (6), in the butterfly IMDCT, the number of MDCT coefficients per computation interval is twice that in the conventional IMDCT. Further, the cosine basis functions differ in phase by $(n+n_0)\pi$. Similarly, the number of MDCT coefficients per computation interval and the phase of the sine basis functions differ between the butterfly IMDST and the conventional IMDST. As a result, if the method that uses FFT in the conventional IMDCT and IMDST were directly applied to the butterfly IMDCT and IMDST, the reconstructed original signal (in the present embodiment, the residual signal) would contain artifact signal components, resulting in a degradation of the original signal.

In view of this, before performing the IMDCT and IMDST, the second inverse modified discrete exponential transform unit 25 reorders the MDCT coefficients and invert their signs so that the number of MDCT coefficients per computation interval and the phase of the basis function match the number of coefficients and the phase of the basis function in the conventional IMDCT or IMDST.

Figure 18:
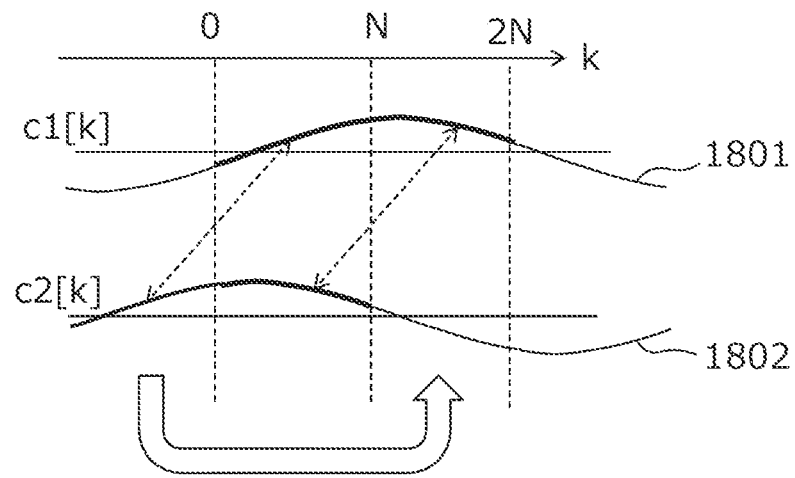
FIG. 18 is a diagram illustrating the relationship between the cosine basis function of a butterfly IMDCT and the cosine basis function of a conventional IMDCT.

Referring to FIG. 18, a description will be given of the relationship between the cosine basis function of the butterfly IMDCT and the cosine basis function of the conventional IMDCT. In FIG. 18, the abscissa represents the frequency k of the MDCT coefficient. Graph 1801 represents the cosine basis function c1[k] of the conventional IMDCT, while graph 1802 represents the cosine basis function c2[k] of the butterfly IMDCT. Since the functions c1[k] and c2[k] respectively correspond to the trigonometric function terms in the equations (5) and (6), these functions are respectively expressed by the following equations.

$$c1[k] = \cos\left(\frac{\pi}{N}(n+n_0)\left(k + \frac{1}{2}\right)\right) \tag{7}$$

$$c2[k] = \cos\left(\frac{\pi}{N}(n+n_0)\left(k - N + \frac{1}{2}\right)\right) \tag{8}$$

It can be seen from FIG. 18 and the above equations (7) and (8) that, between the functions c1[k] and c2[k], the value of k is shifted in phase by N. This means that the value of the cosine basis function c2[k] of the butterfly IMDCT on the interval [0, N-1] is equal to the value of the cosine basis function c1[k] of the conventional IMDCT on the interval [N, 2N-1].

Further, the cosine basis functions c1[k] and c2[k] are equal in absolute value but opposite in sign to the values c1[k-2N] and c2[k-2N] of the respective functions when the value of k differs by 2N. In other words, the following relation holds between the cosine basis functions c1[k] and c2[k].

$$c1[k]=c2[k+N] \quad 0 \le k < N$$

$$c1[k]=-c2[k-N] \quad N \le k < 2N \tag{9}$$

Hence, the following equation holds.

$$ButterflyIMDCT'[n] = \sum_{k=0}^{2N-1} x[k] \cdot c2[k] \quad 0 \le n < 2N \tag{10}$$

$$= \sum_{k=0}^{N-1} x[k] \cdot c2[k] + \sum_{k=N}^{2N-1} x[k] \cdot c2[k]$$

$$= \sum_{k=0}^{N-1} x[k+N] \cdot c1[k] + \sum_{k=N}^{2N-1} -x[k-N] \cdot c1[k]$$

As can be seen from the equation (10), if the MDCT coefficients x[k] (k=0, 1, ..., N-1) in the first half of the interval are interchanged with the MDCT coefficients x[k] (k=N, N+1, ..., 2N-1) in the second half, it becomes possible to apply the cosine basis function c1[k] of the conventional IMDCT to the first half after the interchange. On the other hand, for the MDCT coefficients contained in the second half after the interchange, if their signs are inverted, it becomes possible to apply the cosine basis function c1[k] of the conventional IMDCT. The first and second halves of the interval are each equal in length to the interval to which the conventional IMDCT is applied. Accordingly, the conventional IMDCT can be applied to each of the first and second halves.

A similar relation holds between the sine basis function of the butterfly IMDST and the sine basis function of the conventional IMDST. Accordingly, for the butterfly IMDST also, if the MDCT coefficients in the first half of the computation interval are interchanged with the MDCT coefficients in the second half, and if the sign of the MDCT coefficients contained in the first half after the interchange is inverted, it becomes possible to apply the conventional IMDCT to each of the first and second halves.

Figure 19:
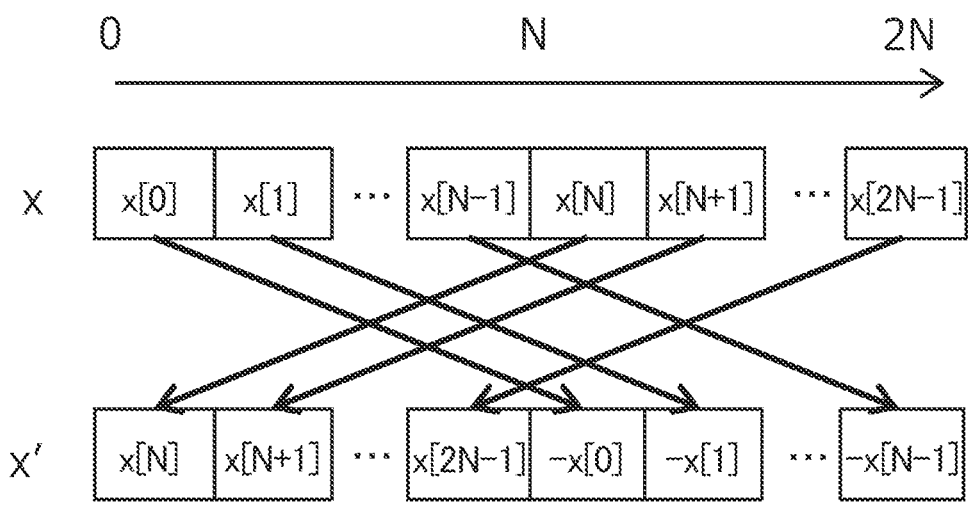
FIG. 19 is a diagram for explaining how the MDCT coefficients are reordered within a butterfly computation interval.

Therefore, the interchanging unit 41 interchanges the MDCT coefficients in the first half of the computation interval with the MDCT coefficients in the second half. The processing performed by the interchanging unit 41 will be described with reference to FIG. 19. The interchanging unit 41 reorders the MDCT coefficients x[k], each multiplied by the windowing function and the gain, by interchanging the order of the first half and the second half, as indicated by arrows in FIG. 19, and thereby obtains the MDCT coefficients x'[k] after the interchange. The process of interchanging is expressed by the following equation.

$$x'[k]=x[k-N]\ N \le k < 2N$$

$$x'[k]=x[k+N]\ 0 \le k < N \tag{11}$$

The interchanging unit 41 passes the MDCT coefficients x'[k] contained in the first half after the interchange, i.e., the MDCT coefficients initially contained in the second half, to an inverse cosine transform unit 51-1 in the butterfly inverse cosine transform unit 43 and an inverse sine transform unit 53-1 in the butterfly inverse sine transform unit 44. At the same time, the interchanging unit 41 passes the MDCT coefficients x'[k] contained in the second half after the interchange, i.e., the MDCT coefficients initially contained in the first half, to the inverting unit 42.

The inverting unit 42 inverts the sign of the MDCT coefficients x'[k] contained in the second half after the interchange. The inverting unit 42 passes the MDCT coefficients x'[k] inverted in sign to an inverse cosine transform unit 51-2 in the butterfly inverse cosine transform unit 43 and an inverse sine transform unit 53-2 in the butterfly inverse sine transform unit 44.

The butterfly inverse cosine transform unit 43 computes the real components of the QMF coefficients by performing the conventional IMDCT using FFT after performing processing such as reordering the MDCT coefficients within the computation interval, rather than directly implementing the butterfly IMDCT. Referring back to FIG. 17, the butterfly inverse cosine transform unit 43 includes an adder 52 in addition to the inverse cosine transform units 51-1 and 51-2.

Similarly, the butterfly inverse sine transform unit 44 computes the imaginary components of the QMF coefficients by performing the conventional IMDST using FFT after performing processing such as reordering the MDCT coefficients within the computation interval. For this purpose, the butterfly inverse sine transform unit 44 includes an adder 54 in addition to the inverse sine transform units 53-1 and 53-2.

The following description deals only with the butterfly inverse cosine transform unit 43. By simply changing the basis functions used for the transform from the cosine functions to the sine functions, the butterfly inverse sine transform unit 44 can accomplish the butterfly IMDST by applying the conventional IMDST using FFT to the MDCT coefficients in a manner similar to the butterfly inverse cosine transform unit 43.

The inverse cosine transform unit 51-1 performs the IMDCT corresponding to the first term on the right-hand side of the equation (10) by using FFT. On the other hand, the inverse cosine transform unit 51-2 performs the IMDCT corresponding to the second term on the right-hand side of the equation (10) by using FFT. The inverse cosine transform units 51-1 and 51-2 employ, for example, the technique disclosed in the earlier cited "Regular FFT-Related Transform Kernels for DCT/DST-Based Polyphase Filter Banks" by Rolf Gluth, IEEE Acoustics, Speech, and Signal Processing, ICASSP-91, 1991, vol. 3, pp. 2205-2208. Since the only difference between the inverse cosine transform units 51-1 and 51-2 is the data to be processed, the following description deals only with the inverse cosine transform unit 51-1.

FIG. 20 is a block diagram of the inverse cosine transform unit 51-1. To implement the technique disclosed in the above literature "Regular FFT-Related Transform Kernels for DCT/DST-Based Polyphase Filter Banks" by Rolf Gluth, IEEE Acoustics, Speech, and Signal Processing, ICASSP-91, 1991, vol. 3, pp. 2205-2208, the inverse cosine transform unit 51-1 includes a pre-rotation unit 61, a fast Fourier transform unit 62, and a post-rotation unit 63.

To narrow the range of computation by exploiting the symmetry of the trigonometric basis functions, the pre-rotation unit 61 obtains a composite function f[k] by compositing the input MDCT coefficients x'[k] in four groups in accordance with the following equation.

$$f[k]=(x[2k]+x[2N-2k-1])-j(x[N+2k]+x[N-2k-1])$$
$$(0 \le k < N/2) \tag{12}$$

Then, the pre-rotation unit 61 rotates the composite function f[k] in the complex plane by one-eighth of a revolution in accordance with the following equation.

$$f'[k] = \beta_{twiddle} \cdot f[k] \tag{13}$$

$$\beta_{twiddle} = \exp\left(-j\frac{\pi}{N}\left(k + \frac{1}{8}\right)\right)$$

The pre-rotation unit 61 passes the rotated composite function f'[k] to the fast Fourier transform unit 62.

The fast Fourier transform unit 62 performs the FFT of the composite function f'[k]. The fast Fourier transform unit 62 can apply any of various computational methods known as FFT. The fast Fourier transform unit 62 passes the coefficients F[n] obtained by the FFT to the post-rotation unit 63.

The post-rotation unit 63 computes coefficients F[n] in accordance with the following equation by rotating the coefficients F[n] by one-eighth of a revolution in the direction opposite to the direction of the rotation applied by the pre-rotation unit 61.

$$F'[n] = -\beta_{twiddle} \cdot F[n] \tag{14}$$

$$\beta_{twiddle} = \exp\left(-j\frac{\pi}{N}\left(k + \frac{1}{8}\right)\right)$$

The post-rotation unit 63 transforms the coefficients F'[n] in the complex plane into the coefficients F''[n] in the real plane in accordance with the following equation.

$$F''[2n]=\text{Re}(F'[n])$$

$$F''[N-1-2n]=-\text{Im}(F'[n])$$

$$F''[N+2n]=\text{Im}(F'[n])$$

$$F''[2N-1-2n]=-\text{Re}(F'[n])\ (0 \le n \le N/2) \tag{15}$$

where the function Re(x) is a function that outputs the real component of the variable x, and the function Im(x) is a function that outputs the imaginary component of the variable x. By multiplying the coefficients F"[n] by a windowing function for the conventional IMDCT, for example, a Kaiser-Bessel window, and a gain $(1/N)^{1/2}$, the post-rotation unit 63 obtains coefficients equivalent to the coefficients obtained by applying the IMDCT to the MDCT coefficients x'[k].

The adder 52 adds the coefficients output from the inverse cosine transform unit 51-1 to the corresponding coefficients output from the inverse cosine transform unit 51-2. This completes the calculation of the right-hand side of the equation (10), completing the butterfly IMDCT of the MDCT coefficients, and the real components of the QMF coefficients are thus obtained. The adder 52 passes the real components of the QMF coefficients to the coefficient adjusting unit 23.

The butterfly inverse sine transform unit 44 computes the imaginary components of the QMF coefficients by performing the IMDST using FFT in a manner similar to the butterfly inverse cosine transform unit 43. The butterfly inverse sine transform unit 44 passes the imaginary components of the QMF coefficients to the coefficient adjusting unit 23.

When the real and imaginary components of the QMF coefficients are received from the second inverse modified discrete exponential transform unit 25, the coefficient adjusting unit 23 can likewise compute the QMF coefficients by combining the real and imaginary components in accordance with the earlier given equation (4).

The following table is a table that indicates the amount of computation per IMDET according to the present embodiment when the number, M, of MDCT coefficients contained in one computation interval is (2N).

M is smaller than 8, the amount of computation is smaller when the IMDET is performed by utilizing the symmetry of the basis functions than when it is performed by using FFT. This is because the computational burden associated with the pre-processing and post-processing becomes relatively large in the method that performs the IMDET by using FFT. Accordingly, in the present embodiment, the switching unit 24 selects the inverse modified discrete exponential transform unit 22 so that the IMDET is performed by utilizing the symmetry of the basis functions when M is smaller than 8 or when M is not a power of 2. Especially, in the AAC coding scheme or the like applied to the residual signal, since a short frame is used in the case of an attack sound, the number of MDCT coefficients contained in the IMDET computation interval may become smaller than 8. Therefore, in the orthogonal transform apparatus according to the present embodiment and the audio decoding apparatus incorporating the orthogonal transform apparatus, the amount of computation can be reduced compared with the case where the IMDET is performed using FFT when short frames are used to encode the residual signal. On the other hand, in such cases as when the residual signal is AAC encoded using relatively long frames, the orthogonal transform apparatus and the audio decoding apparatus can reduce the amount of computation of the IMDET by performing the IMDET using FFT.

In a modified example, the local multiplication unit 32 may calculate the intermediate computed values by only calculating the products between the basis function values corresponding to the real or imaginary component of the QMF

TABLE 1

| | AMOUNT OF COMPUTATION PER IMDET | | | | | | | | | |
|---|---|---|---|---|---|---|---|---|---|---|
| | NUMBER OF MULTIPLICATIONS | | | | | NUMBER OF ADDITIONS | | | | |
| LENGTH OF INTERVAL | M(= 2N) (N IS EVEN) | 8 | 4 | M (N IS ODD) | 6 | M (N IS EVEN) | 8 | 4 | M (N IS ODD) | 6 |
| USING FFT | $M\log\frac{M}{4} + \frac{M}{2} + 24$ | 36 | 26 | — | — | $\frac{3M}{2}\log\frac{M}{4} + \frac{3M}{2} + 8$ | 32 | 14 | — | — |
| CONVENTIONAL (DEFINING EQUATION) | $2M^2$ | 128 | 32 | $2M^2$ | 72 | $2M^2 - 2M$ | 112 | 24 | $2M^2 - 2M$ | 60 |
| UTILIZING SYMMETRY | $\frac{M^2}{2}$ | 32 | 8 | $\frac{M^2}{2} - M$ | 12 | $\frac{M^2}{2}$ | 32 | 8 | $\frac{M^2}{2} + M - 2$ | 22 |

As seen in the table, the amount of computation per butterfly IMDCT according to the second inverse modified discrete exponential transform unit 25 that uses FFT is of the order of M log M which is equivalent to the amount of computation of the FFT. On the other hand, the amount of computation per IMDET according to the inverse modified discrete exponential transform unit 22 that utilizes the symmetry of the basis functions is of the order of $M^2$.

FIG. 21 is a diagram of graphs illustrating the relationship between the number, M, of MDCT coefficients contained in the computation interval and the amount of computation for the IMDET that utilizes the symmetry of the basis functions in comparison with that for the IMDET that uses FFT. Graph 2100 represents the relationship between the number, M, of MDCT coefficients and the number of multiplications for the IMDET that utilizes the symmetry of the basis functions, and graph 2110 represents the relationship between the number, M, of MDCT coefficients and the number of multiplications for the IMDET that uses FFT. As is apparent from FIG. 21, if coefficient contained in the designated subinterval of the QMF coefficient sequence and the corresponding MDF coefficients. In this case, the coefficient computing unit 33 need only compute, for each QMF coefficient, the sum of the products of the MDF coefficients and the basis function values in the odd-numbered columns and the sum of the products of the MDF coefficients and the basis function values in the even-numbered columns. In this modified example also, since the number of computations involved in computing the products of the basis function values and the MDF coefficients can be reduced to one quarter of the number of computations involved in computing the products of the basis function values and the MDF coefficients in the conventional IMDET, the amount of computation of the entire IMDET can be reduced.

A computer program for causing a computer to implement the functions of the various units constituting the orthogonal transform apparatus according to the above embodiment or its modified example may be distributed in the form stored in a semiconductor memory or in the form recorded on a recording medium such as a magnetic recording medium or an optical recording medium. Likewise, a computer program for causing a computer to implement the functions of the various units constituting the audio decoding apparatus according to the above embodiment or its modified example may be distributed in the form stored in a semiconductor memory or in the form recorded on a recording medium such as a magnetic recording medium or an optical recording medium. The term "recording medium" used here does not include a carrier wave.

Figure 22:
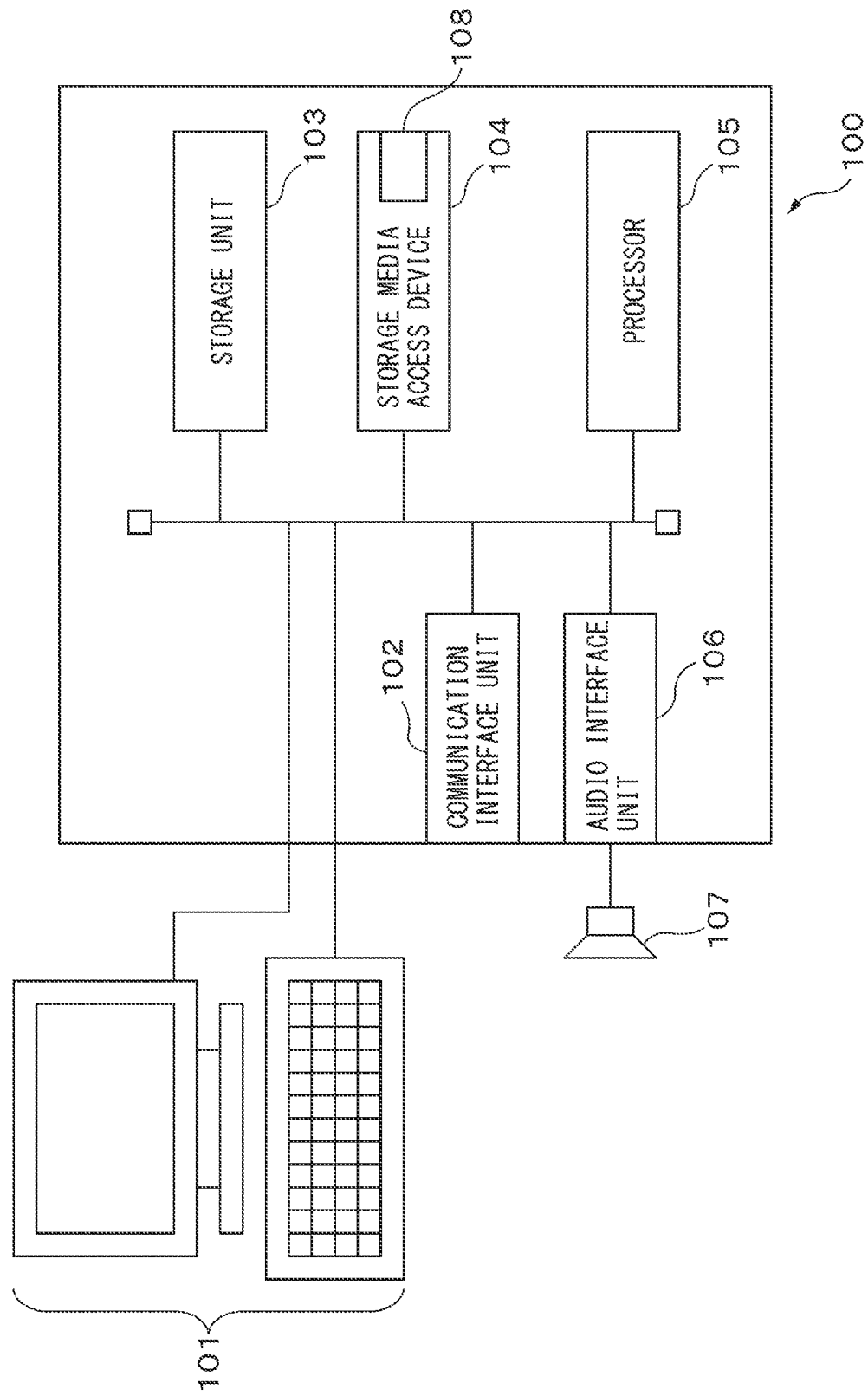
FIG. 22 is a diagram illustrating the configuration of a computer that operates as the audio decoding apparatus by executing a computer program for implementing the functions of the various units constituting the audio decoding apparatus according to the above embodiment or its modified example.

FIG. 22 is a diagram illustrating the configuration of a computer that operates as the audio decoding apparatus by executing a computer program for implementing the functions of the various units constituting the audio decoding apparatus according to the above embodiment or its modified example.

The computer 100 includes a user interface unit 101, a communication interface unit 102, a storage unit 103, a storage media access device 104, a processor 105, and an audio interface unit 106. The processor 105 is connected to the user interface unit 101, communication interface unit 102, storage unit 103, storage media access device 104, and audio interface unit 106, for example, via a bus.

The user interface unit 101 includes, for example, an input device such as a keyboard and a mouse, and a display device such as a liquid crystal display. Alternatively, the user interface unit 101 may include a device, such as a touch panel display, into which an input device and a display device are integrated. The user interface unit 101 generates, for example, in response to a user operation, an operation signal for selecting audio data to be decoded, and supplies the operation signal to the processor 105.

The communication interface unit 102 may include a communication interface for connecting the computer 100 to an audio data encoding apparatus, for example, a video camera, and a control circuit for the communication interface. Such a communication interface may be, for example, a Universal Serial Bus (USB) interface.

Further, the communication interface unit 102 may include a communication interface for connecting to a communication network conforming to a communication standard such as the Ethernet (registered trademark), and a control circuit for the communication interface.

In the latter case, the communication interface unit 102 receives encoded audio data to be decoded from another apparatus connected to the communication network, and passes the received data to the processor 105.

The storage unit 103 includes, for example, a readable/writable semiconductor memory and a read-only semiconductor memory. The storage unit 103 stores a computer program for implementing the audio decoding process to be executed on the processor 105, and also stores the data generated as a result of or during the execution of the program.

The storage media access device 104 is a device that accesses a storage medium 108 such as a magnetic disk, a semiconductor memory card, or an optical storage medium. The storage media access device 104 accesses the storage medium 108 to read out, for example, the computer program for audio decoding to be executed on the processor 105, and passes the readout computer program to the processor 105.

The processor 105 decodes the encoded audio data by executing the audio decoding computer program according to the above embodiment or its modified example. The processor 105 outputs the decoded audio data to a speaker 107 via the audio interface unit 106.

The orthogonal transform apparatus according to the above embodiment or its modified example may be adapted for use in applications other than the decoding of the audio signals encoded in accordance with the MPEG Surround System. The orthogonal transform apparatus according to the above embodiment or its modified example can be applied to various kinds of apparatus that need to transform MDCT coefficients into QMF coefficients.

Further, the audio decoding apparatus according to the above embodiment or its modified example can be incorporated in various kinds of apparatus, such as a computer, a video signal recording/reproduction machine, etc., used to reproduce encoded audio signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An orthogonal transform apparatus for transforming a plurality of modified discrete cosine transform coefficients contained in a prescribed interval into a coefficient sequence containing a plurality of quadrature mirror filter coefficients, comprising:

an inverse exponential transform unit which computes either one of the real and imaginary components of the quadrature mirror filter coefficient contained in a first subinterval of a plurality subintervals among which the coefficient sequence is divided so that the values of basis functions used to compute the coefficient sequence are symmetrically placed, by computing a sum of products of the plurality of modified discrete cosine transform coefficients and the basis functions corresponding to the first subinterval, and computes the other one of the real and imaginary components of the quadrature mirror filter coefficient contained in the first subinterval and the real and imaginary components of the quadrature mirror filter coefficient contained in another subintervals of the plurality of subintervals by performing a butterfly operation using a computed value produced as a result of the sum of products; and a coefficient adjusting unit which computes the quadrature mirror filter coefficients by combining the real component and the imaginary component for each of the plurality of quadrature mirror filter coefficients.

2. The orthogonal transform apparatus according to claim 1, wherein the inverse exponential transform unit comprises:

a local multiplication unit which produces the computed value by computing the sum of products of the plurality of modified discrete cosine transform coefficients and the basis functions corresponding to the first subinterval;

a storage unit which stores the computed value; and a coefficient computing unit which retrieves the computed value from the storage unit and computes, for each of the plurality of subintervals, the real and imaginary components of the quadrature mirror filter coefficient contained in the subinterval.

3. The orthogonal transform apparatus according to claim 2, wherein the local multiplication unit produces the computed value by computing the sum of the products of odd-numbered modified discrete cosine transform coefficients and the values of odd-numbered basis functions among the basis functions corresponding to the real component of the quadrature mirror filter coefficient contained in the first subinterval and the sum of the products of even-numbered modified discrete cosine transform coefficients and the values of even-numbered basis functions among the basis functions corresponding to the real component of the quadrature mirror filter coefficient contained in the first subinterval.

4. The orthogonal transform apparatus according to claim 3, wherein by reversing the order of the real components of the quadrature mirror filter coefficients contained in the first subinterval, the coefficient computing unit computes the real components of the quadrature mirror filter coefficients contained in the another subintervals of the plurality of subintervals in which the values of the basis functions are symmetrical in position to the values of the basis functions corresponding to the first subinterval.

5. The orthogonal transform apparatus according to claim 4, wherein the first subinterval contains either one of first and second halves of the first half of the coefficient sequence and either one of first and second halves of the second half of the coefficient sequence.

6. The orthogonal transform apparatus according to claim 5, wherein the coefficient computing unit computes the imaginary component of the quadrature mirror filter coefficient contained in the first or second half of the first half of the coefficient sequence, whichever half is not contained in the first subinterval, by compensating for a phase difference between the basis functions corresponding to the real component of the quadrature mirror filter coefficient and the basis functions corresponding to the imaginary component of the quadrature mirror filter coefficient and thereby compensating the computed value calculated for the first or second half of the second half of the coefficient sequence, whichever half is contained in the first subinterval.

7. The orthogonal transform apparatus according to claim 1, further comprising:
   a second inverse exponential transform unit which computes the real components of the plurality of quadrature mirror filter coefficients by applying an inverse modified discrete cosine transform using a fast Fourier transform to the plurality of modified discrete cosine transform coefficients, and which computes the imaginary components of the plurality of quadrature mirror filter coefficients by applying an inverse modified discrete sine transform using a fast Fourier transform to the plurality of modified discrete cosine transform coefficients; and
   a switching unit which causes the inverse exponential transform unit or the second inverse exponential, transform unit, whichever unit is selected according to the number of modified discrete cosine transform coefficients contained in the prescribed interval, to compute the real and imaginary components of the plurality of quadrature mirror filter coefficients.

8. The orthogonal transform apparatus according to claim 7, wherein when the number of modified discrete cosine transform coefficients contained in the prescribed interval is smaller than 8, or when the number is not a power of 2, the switching unit causes the inverse exponential transform unit to compute the real and imaginary components of the plurality of quadrature mirror filter coefficients, on the other hand, when the number of modified discrete cosine transform coefficients contained in the prescribed interval is equal to or larger than 8, and when the number is a power of 2, the switching unit causes the second inverse exponential transform unit to compute the real and imaginary components of the plurality of quadrature mirror filter coefficients.

9. The orthogonal transform apparatus according to claim 7, wherein the second inverse exponential transform unit comprises:
   an interchanging unit which interchanges the modified discrete cosine transform coefficients contained in the first half of the prescribed interval with the modified discrete cosine transform coefficients contained in the second half of the prescribed interval;
   an inverting unit which inverts the sign of the modified discrete cosine transform coefficients contained in the second half of the prescribed interval after the interchange;
   a first sub inverse cosine transform unit which computes first coefficients by applying the inverse modified discrete cosine transform using the fast Fourier transform to the modified discrete cosine transform coefficients contained in the first half of the prescribed interval after the interchange;
   a second sub inverse cosine transform unit which computes second coefficients by applying the inverse modified discrete cosine transform using the fast Fourier transform to the sign-inverted modified discrete cosine transform coefficients contained in the second half of the prescribed interval after the interchange; and
   an adder which computes the real components of the quadrature mirror filter coefficients by adding the first and second coefficients.

10. An orthogonal transform method for transforming a plurality of modified discrete cosine transform coefficients contained in a prescribed interval into a coefficient sequence containing a plurality of quadrature mirror filter coefficients, comprising:
   computing either one of the real and imaginary components of the quadrature mirror filter coefficient contained in a first subinterval of a plurality subintervals among which the coefficient sequence is divided so that the values of basis functions used to compute the coefficient sequence are symmetrically placed, by computing a sum of products of the plurality of modified discrete cosine transform coefficients and the basis functions corresponding to the first subinterval;
   computing the other one of the real and imaginary components of the quadrature mirror filter coefficient contained in the first subinterval and the real and imaginary components of the quadrature mirror filter coefficient contained in another subintervals of the plurality of subintervals by performing a butterfly operation using a computed value produced as a result of the sum of products; and
   computing the quadrature mirror filter coefficients by combining the real component and the imaginary component for each of the plurality of quadrature mirror filter coefficients.

11. The orthogonal transform method according to claim 10, wherein the computing either one of the real and imaginary components of the quadrature mirror filter coefficient contained in the first subinterval comprises:
   producing the computed value by computing the sum of products of the plurality of modified discrete cosine transform coefficients and the basis functions corresponding to the first subinterval;
   storing the computed value; and
   retrieving the computed value from the storage unit and computing, for each of the plurality of subintervals, the real and imaginary components of the quadrature mirror filter coefficient contained in the subinterval.

12. The orthogonal transform method according to claim 11, wherein the producing the computed value produces the computed value by computing the sum of the products of odd-numbered modified discrete cosine transform coefficients and the values of odd-numbered basis functions among the basis functions corresponding to the real component of the quadrature mirror filter coefficient contained in the first subinterval and the sum of the products of even-numbered modified discrete cosine transform coefficients and the values of even-numbered basis functions among the basis functions corresponding to the real component of the quadrature mirror filter coefficient contained in the first subinterval.

13. The orthogonal transform method according to claim 12, wherein by reversing the order of the real components of the quadrature mirror filter coefficients contained in the first subinterval, the computing the real and imaginary components of the quadrature mirror filter coefficient contained in the subinterval computes the real components of the quadrature mirror filter coefficients contained in the another subintervals of the plurality of subintervals in which the values of the basis functions are symmetrical in position to the values of the basis functions corresponding to the first subinterval.

14. The orthogonal transform method according to claim 13, wherein the first subinterval contains either one of first and second halves of the first half of the coefficient sequence and either one of first and second halves of the second half of the coefficient sequence.

15. The orthogonal transform method according to claim 14, wherein the computing the real and imaginary components of the quadrature mirror filter coefficient contained in the subinterval computes the imaginary component of the quadrature mirror filter coefficient contained in the first or second half of the first half of the coefficient sequence, whichever half is not contained in the first subinterval, by compensating for a phase difference between the basis functions corresponding to the real component of the quadrature mirror filter coefficient and the basis functions corresponding to the imaginary component of the quadrature mirror filter coefficient and thereby compensating the computed value calculated for the first or second half of the second half of the coefficient sequence, whichever half is contained in the first subinterval.

16. A non-transitory computer-readable recording medium having recorded thereon an orthogonal transform computer program that causes a computer to execute a process of transforming a plurality of modified discrete cosine transform coefficients contained in a prescribed interval into a coefficient sequence containing a plurality of quadrature mirror filter coefficients, the process comprising:
  computing either one of the real and imaginary components of the quadrature mirror filter coefficient contained in a first subinterval of a plurality subintervals among which the coefficient sequence is divided so that the values of basis functions used to compute the coefficient sequence are symmetrically placed, by computing a sum of products of the plurality of modified discrete cosine transform coefficients and the basis functions corresponding to the first subinterval;
  computing the other one of the real and imaginary components of the quadrature mirror filter coefficient contained in the first subinterval and the real and imaginary components of the quadrature mirror filter coefficient contained in another subintervals of the plurality of subintervals by performing a butterfly operation using a computed value produced as a result of the sum of products; and
  computing the quadrature mirror filter coefficients by combining the real component and the imaginary component for each of the plurality of quadrature mirror filter coefficients.

17. An audio decoding apparatus for decoding a multichannel audio signal from a data stream containing a main signal code into which a main signal representing a main component of each channel obtained by downmixing each channel signal of the multichannel audio signal is encoded, a residual signal code into which coefficients obtained by performing a modified discrete cosine transform on a residual signal orthogonal to the main signal are encoded, and a spatial information code into which spatial information representing the degree of interchannel similarity and interchannel intensity difference is encoded, the audio decoding apparatus comprising:
  a demultiplexing unit which demultiplexes the main signal code, the residual signal code, and the spatial information code from the data stream;
  a main signal decoding unit which reconstructs the main signal in a time domain by decoding the main signal code;
  a quadrature mirror filtering unit which transforms the main signal in the time domain into quadrature mirror filter coefficients in a time-frequency domain by applying quadrature mirror filtering to the main signal;
  a spatial information decoding unit which reconstructs the spatial information by decoding the spatial information code;
  a residual signal decoding unit which reconstructs the modified discrete cosine transform coefficients of the residual signal by decoding the residual signal code;
  an orthogonal transform unit which, for each of a plurality of prescribed intervals generated so as to overlap each other by one half by dividing an entire frequency band, transforms the modified discrete cosine transform coefficients of the residual signal contained in the prescribed interval into a coefficient sequence containing a plurality of quadrature mirror filter coefficients in the time-frequency domain;
  an upmixing unit which computes quadrature mirror filter coefficients for each channel of the audio signal by upmixing the quadrature mirror filter coefficients of the main signal and the quadrature mirror filter coefficients of the residual signal by using the spatial information; and
  an inverse quadrature mirror filtering unit which reconstructs each channel signal of the audio signal by applying inverse quadrature mirror filtering to the quadrature mirror filter coefficients of each channel, and wherein
  the orthogonal transform unit comprises:
  an inverse exponential transform unit which computes either one of the real and imaginary components of the quadrature mirror filter coefficient of the residual signal contained in a first subinterval of a plurality subintervals among which the coefficient sequence is divided so that the values of basis functions used to compute the coefficient sequence are symmetrically placed, by computing a sum of products of the plurality of modified discrete cosine transform coefficients and the basis functions corresponding to the first subinterval, and computes the other one of the real and imaginary components of the quadrature mirror filter coefficient of the residual signal contained in the first subinterval and the real and imaginary components of the quadrature mirror filter coefficient of the residual signal contained in another subintervals of the plurality of subintervals by performing a butterfly operation using a computed value produced as a result of the sum of products; and a coefficient adjusting unit which computes the quadrature mirror filter coefficients by combining the real component and the imaginary component for each of the plurality of quadrature mirror filter coefficients of the residual signal.

* * * * *